(12) United States Patent
Binder

(10) Patent No.: US 8,761,186 B2
(45) Date of Patent: Jun. 24, 2014

(54) TELEPHONE OUTLET WITH PACKET TELEPHONY ADAPTER, AND A NETWORK USING SAME

(75) Inventor: Yehuda Binder, Hod Hasharon (IL)

(73) Assignee: Conversant Intellectual Property Management Incorporated, Ottawa, Ontario (CA)

( * ) Notice: Subject to any disclaimer, the term of this patent is extended or adjusted under 35 U.S.C. 154(b) by 665 days.

(21) Appl. No.: 12/683,731

(22) Filed: Jan. 7, 2010

(65) Prior Publication Data

US 2010/0103928 A1    Apr. 29, 2010

Related U.S. Application Data

(63) Continuation of application No. 11/001,057, filed on Dec. 2, 2004, now Pat. No. 7,769,030, which is a continuation of application No. 10/469,576, filed as application No. PCT/IL01/00954 on Oct. 15, 2001, now Pat. No. 7,542,554.

(30) Foreign Application Priority Data

Jul. 5, 2001 (IL) .......................................... 144158

(51) Int. Cl.
    *H04L 12/28* (2006.01)
(52) U.S. Cl.
    USPC ........... 370/401; 370/352; 370/419; 370/463; 379/399.02; 379/93.05
(58) Field of Classification Search
    None
    See application file for complete search history.

(56) References Cited

U.S. PATENT DOCUMENTS

| | | | |
|---|---|---|---|
| 2,264,395 | A | 12/1941 | Mitchell |
| 2,264,396 | A | 12/1941 | Moore |

(Continued)

FOREIGN PATENT DOCUMENTS

| | | |
|---|---|---|
| EP | 0 824 298 A2 | 2/1998 |
| GB | 2 352 360 A | 1/2001 |

(Continued)

OTHER PUBLICATIONS

"The DSL Sourcebook", Paradyne Corporation, Copyright 2000, DSL-BOOK-3.0-0900, 98 pages.

(Continued)

*Primary Examiner* — Michael J Moore, Jr.
(74) *Attorney, Agent, or Firm* — Winstead PC

(57) ABSTRACT

An outlet for a Local Area Network (LAN), containing an integrated adapter that converts VoIP to and from analog telephony, and a standard telephone jack (e.g. RJ-11 in North America) for connecting an ordinary analog (POTS) telephone set. Such an outlet allows using analog telephone sets in a VoIP environment, eliminating the need for an IP telephone set or external adapter. The outlet may also include a hub that allows connecting both an analog telephone set via an adapter, as well as retaining the data network connection, which may be accessed by a network jack. The invention may also be applied to a telephone line-based data networking system. In such an environment, the data networking circuitry as well as the VoIP/POTS adapters are integrated into a telephone outlet, providing for regular analog service, VoIP telephony service using an analog telephone set, and data networking as well. In such a configuration, the outlet requires two standard telephone jacks and a data-networking jack. Outlets according to the invention can be used to retrofit existing LAN and in-building telephone wiring, as well as original equipment in new installation.

14 Claims, 14 Drawing Sheets

(56) References Cited

U.S. PATENT DOCUMENTS

| | | |
|---|---|---|
| 2,298,435 A | 10/1942 | Tunick |
| 2,510,273 A | 6/1950 | Barstow et al. |
| 2,516,211 A | 7/1950 | Hochgraf |
| 2,568,342 A | 9/1951 | Koehler et al. |
| 3,280,259 A | 10/1966 | Cotter |
| 3,366,744 A | 1/1968 | Miller |
| 3,369,078 A | 2/1968 | Stradley |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Haselwood et al. |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,937,889 A | 2/1976 | Bell, III et al. |
| 3,949,172 A | 4/1976 | Brown et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,058,678 A | 11/1977 | Dunn et al. |
| 4,171,467 A | 10/1979 | Evenchik |
| 4,206,320 A | 6/1980 | Keasler et al. |
| 4,262,171 A | 4/1981 | Schneider et al. |
| 4,302,629 A | 11/1981 | Foulkes et al. |
| 4,328,579 A | 5/1982 | Hashimoto et al. |
| 4,330,687 A | 5/1982 | Foulkes et al. |
| 4,332,980 A | 6/1982 | Reynolds et al. |
| 4,335,464 A | 6/1982 | Armstrong et al. |
| 4,339,816 A | 7/1982 | Reed |
| 4,367,548 A | 1/1983 | Cotten, Jr. et al. |
| 4,378,470 A | 3/1983 | Murto et al. |
| 4,380,009 A | 4/1983 | Long et al. |
| 4,381,427 A | 4/1983 | Cheal et al. |
| 4,387,271 A | 6/1983 | Artom |
| 4,388,489 A | 6/1983 | Wigan et al. |
| 4,390,986 A | 6/1983 | Moses |
| 4,393,508 A | 7/1983 | Boudault |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,475,193 A | 10/1984 | Brown |
| 4,479,033 A | 10/1984 | Brown et al. |
| 4,485,400 A | 11/1984 | Lemelson et al. |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,793 A | 3/1985 | Adams |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab Der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,631,367 A | 12/1986 | Coviello et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,665,544 A | 5/1987 | Honda et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,701,945 A | 10/1987 | Pedigo |
| 4,703,499 A | 10/1987 | Fossas et al. |
| 4,709,412 A | 11/1987 | Seymour et al. |
| 4,731,821 A | 3/1988 | Jackson, III |
| 4,734,932 A | 3/1988 | Lott |
| 4,740,963 A | 4/1988 | Eckley |
| 4,748,656 A | 5/1988 | Gibbs et al. |
| 4,754,326 A | 6/1988 | Kram et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,829,570 A | 5/1989 | Schotz |
| 4,837,799 A | 6/1989 | Prohs et al. |
| 4,839,743 A | 6/1989 | Best et al. |
| 4,843,606 A | 6/1989 | Bux et al. |
| 4,847,903 A | 7/1989 | Schotz |
| 4,849,811 A | 7/1989 | Kleinerman |
| 4,852,151 A | 7/1989 | Dittakavi et al. |
| 4,866,704 A | 9/1989 | Bergman |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,891,694 A | 1/1990 | Way |
| 4,893,326 A | 1/1990 | Duran et al. |
| 4,896,349 A | 1/1990 | Kubo et al. |
| 4,901,342 A | 2/1990 | Jones |
| 4,903,292 A | 2/1990 | Dillon |
| 4,914,688 A | 4/1990 | Kobayashi et al. |
| 4,918,688 A | 4/1990 | Krause et al. |
| 4,924,492 A | 5/1990 | Gitlin et al. |
| 4,932,022 A | 6/1990 | Keeney et al. |
| 4,932,047 A | 6/1990 | Emmons et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlin et al. |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |
| 4,989,081 A | 1/1991 | Miyagawa et al. |
| 4,996,709 A | 2/1991 | Heep et al. |
| 5,010,399 A | 4/1991 | Goodman et al. |
| 5,022,069 A | 6/1991 | Chen |

(56) References Cited

U.S. PATENT DOCUMENTS

| | | |
|---|---|---|
| 5,023,868 A | 6/1991 | Davidson et al. |
| 5,027,426 A | 6/1991 | Chiocca, Jr. |
| 5,034,948 A | 7/1991 | Mizutani et al. |
| 5,036,513 A | 7/1991 | Greenblatt |
| 5,042,028 A | 8/1991 | Ogawa |
| 5,051,822 A | 9/1991 | Rhoades |
| 5,066,939 A | 11/1991 | Mansfield, Jr. |
| 5,070,522 A | 12/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,111,497 A | 5/1992 | Bliven et al. |
| 5,127,003 A | 6/1992 | Doll, Jr. et al. |
| 5,140,630 A | 8/1992 | Fry et al. |
| 5,142,568 A | 8/1992 | Ogata et al. |
| 5,151,838 A | 9/1992 | Dockery |
| 5,247,347 A | 9/1993 | Litteral et al. |
| 5,257,006 A | 10/1993 | Graham et al. |
| 5,265,154 A | 11/1993 | Schotz |
| 5,283,637 A | 2/1994 | Goolcharan |
| 5,283,825 A | 2/1994 | Druckman et al. |
| 5,305,312 A | 4/1994 | Fornek et al. |
| 5,319,634 A | 6/1994 | Bartholomew et al. |
| 5,341,099 A | 8/1994 | Suzuki |
| 5,341,415 A | 8/1994 | Baran |
| 5,345,437 A | 9/1994 | Ogawa |
| 5,353,334 A | 10/1994 | O'Sullivan |
| 5,363,432 A | 11/1994 | Martin et al. |
| 5,379,005 A | 1/1995 | Aden et al. |
| 5,381,137 A | 1/1995 | Ghaem et al. |
| 5,381,459 A | 1/1995 | Lappington |
| 5,381,462 A | 1/1995 | Larson et al. |
| 5,408,260 A | 4/1995 | Arnon |
| 5,410,343 A | 4/1995 | Coddington et al. |
| 5,425,089 A | 6/1995 | Chan et al. |
| 5,428,608 A | 6/1995 | Freeman et al. |
| 5,440,335 A | 8/1995 | Beveridge |
| 5,448,635 A | 9/1995 | Biehl et al. |
| 5,452,289 A | 9/1995 | Sharma et al. |
| 5,463,616 A | 10/1995 | Kruse et al. |
| 5,479,447 A | 12/1995 | Chow et al. |
| 5,489,894 A | 2/1996 | Murray |
| 5,499,241 A | 3/1996 | Thompson et al. |
| 5,513,251 A | 4/1996 | Rochkind et al. |
| 5,519,731 A | 5/1996 | Cioffi |
| 5,530,737 A | 6/1996 | Bartholomew et al. |
| 5,530,894 A | 6/1996 | Farrell et al. |
| 5,533,101 A | 7/1996 | Miyagawa |
| 5,534,912 A | 7/1996 | Kostreski |
| 5,548,592 A | 8/1996 | Komarek et al. |
| 5,550,836 A | 8/1996 | Albrecht et al. |
| 5,550,900 A | 8/1996 | Ensor et al. |
| 5,553,063 A | 9/1996 | Dickson |
| 5,557,612 A | 9/1996 | Bingham |
| 5,566,233 A | 10/1996 | Liu |
| 5,570,355 A | 10/1996 | Dail et al. |
| 5,581,555 A | 12/1996 | Dubberly et al. |
| 5,587,692 A | 12/1996 | Graham et al. |
| 5,590,173 A | 12/1996 | Beasley |
| 5,592,540 A | 1/1997 | Beveridge |
| 5,594,726 A | 1/1997 | Thompson et al. |
| 5,594,789 A | 1/1997 | Seazholtz et al. |
| 5,596,631 A | 1/1997 | Chen |
| 5,604,737 A | 2/1997 | Iwami et al. |
| 5,604,791 A | 2/1997 | Lee |
| 5,608,447 A | 3/1997 | Farry et al. |
| 5,608,725 A | 3/1997 | Grube et al. |
| 5,610,916 A | 3/1997 | Kostreski et al. |
| 5,613,190 A | 3/1997 | Hylton |
| 5,613,191 A | 3/1997 | Hylton |
| 5,619,252 A | 4/1997 | Nakano |
| 5,619,505 A | 4/1997 | Grube et al. |
| 5,621,455 A | 4/1997 | Rogers et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,627,827 A | 5/1997 | Dale et al. |
| 5,646,983 A | 7/1997 | Suffern et al. |
| 5,668,814 A | 9/1997 | Balatoni |
| 5,668,857 A | 9/1997 | McHale |
| 5,673,290 A | 9/1997 | Cioffi |
| 5,675,375 A | 10/1997 | Riffee |
| 5,696,790 A | 12/1997 | Graham et al. |
| 5,699,413 A | 12/1997 | Sridhar |
| 5,705,974 A | 1/1998 | Patel et al. |
| 5,708,701 A | 1/1998 | Houvig et al. |
| 5,712,977 A | 1/1998 | Glad et al. |
| 5,729,824 A | 3/1998 | O'Neill et al. |
| 5,737,333 A | 4/1998 | Civanlar et al. |
| 5,737,475 A | 4/1998 | Regester |
| 5,742,596 A | 4/1998 | Baratz et al. |
| 5,751,701 A | 5/1998 | Langberg et al. |
| 5,756,280 A | 5/1998 | Soora et al. |
| 5,757,803 A | 5/1998 | Russell et al. |
| 5,757,936 A | 5/1998 | Lee |
| 5,764,743 A | 6/1998 | Goedken et al. |
| 5,767,895 A | 6/1998 | Yashiro et al. |
| 5,768,279 A | 6/1998 | Barn et al. |
| 5,771,236 A | 6/1998 | Sansom et al. |
| 5,774,526 A | 6/1998 | Propp et al. |
| 5,778,303 A | 7/1998 | Shinozaki et al. |
| 5,781,617 A | 7/1998 | McHale et al. |
| 5,787,115 A | 7/1998 | Turnbull et al. |
| 5,790,548 A | 8/1998 | Sistanizadeh et al. |
| 5,793,413 A | 8/1998 | Hylton et al. |
| 5,802,177 A | 9/1998 | Daniel et al. |
| 5,802,283 A | 9/1998 | Grady et al. |
| 5,805,591 A | 9/1998 | Naboulsi et al. |
| 5,809,033 A | 9/1998 | Turner et al. |
| 5,809,431 A | 9/1998 | Bustamante et al. |
| 5,812,786 A | 9/1998 | Seazholtz et al. |
| 5,822,374 A | 10/1998 | Levin |
| 5,822,678 A | 10/1998 | Evanyk |
| 5,826,196 A | 10/1998 | Cuthrell |
| 5,828,821 A | 10/1998 | Hoshina et al. |
| 5,832,057 A | 11/1998 | Furman |
| 5,838,777 A | 11/1998 | Chang et al. |
| 5,841,360 A | 11/1998 | Binder |
| 5,841,840 A | 11/1998 | Smith et al. |
| 5,841,841 A | 11/1998 | Dodds et al. |
| 5,842,111 A | 11/1998 | Byers |
| 5,848,150 A | 12/1998 | Bingel |
| 5,878,047 A | 3/1999 | Ganek et al. |
| 5,881,142 A | 3/1999 | Frankel et al. |
| 5,886,732 A | 3/1999 | Humpleman |
| 5,889,765 A | 3/1999 | Gibbs |
| 5,889,856 A | 3/1999 | O'Toole et al. |
| 5,892,764 A | 4/1999 | Riemann et al. |
| 5,896,443 A | 4/1999 | Dichter |
| 5,896,556 A | 4/1999 | Moreland et al. |
| 5,898,761 A | 4/1999 | McHale et al. |
| 5,903,572 A | 5/1999 | Wright et al. |
| 5,903,643 A | 5/1999 | Bruhnke |
| 5,905,781 A | 5/1999 | McHale et al. |
| 5,905,786 A | 5/1999 | Hoopes |
| 5,910,970 A | 6/1999 | Lu |
| 5,911,119 A | 6/1999 | Bartholomew et al. |
| 5,911,123 A | 6/1999 | Shaffer et al. |
| 5,912,895 A | 6/1999 | Terry et al. |
| 5,917,814 A | 6/1999 | Balatoni |
| 5,926,479 A | 7/1999 | Baran |
| 5,930,340 A | 7/1999 | Bell |
| 5,936,952 A | 8/1999 | Lecomte |
| 5,936,963 A | 8/1999 | Saussy |
| 5,937,055 A | 8/1999 | Kaplan |
| 5,940,479 A | 8/1999 | Guy et al. |
| 5,940,738 A | 8/1999 | Rao |
| 5,943,404 A | 8/1999 | Sansom et al. |
| 5,949,476 A | 9/1999 | Pocock et al. |
| 5,956,323 A | 9/1999 | Bowie |

(56) References Cited

U.S. PATENT DOCUMENTS

| | | |
|---|---|---|
| 5,960,066 A | 9/1999 | Hartmann et al. |
| 5,963,539 A | 10/1999 | Webber, Jr. et al. |
| 5,963,595 A | 10/1999 | Graham et al. |
| 5,963,620 A | 10/1999 | Frankel et al. |
| 5,970,127 A | 10/1999 | Smith et al. |
| 5,982,784 A | 11/1999 | Bell |
| 5,982,854 A | 11/1999 | Ehreth |
| 5,987,061 A | 11/1999 | Chen |
| 5,991,311 A | 11/1999 | Long et al. |
| 5,995,598 A | 11/1999 | Berstis |
| 5,999,518 A | 12/1999 | Nattkemper et al. |
| 5,999,612 A | 12/1999 | Dunn et al. |
| 6,002,682 A | 12/1999 | Bellenger et al. |
| 6,002,722 A | 12/1999 | Wu |
| 6,005,873 A | 12/1999 | Amit |
| 6,009,041 A | 12/1999 | Rolandi et al. |
| 6,011,781 A | 1/2000 | Bell |
| 6,011,910 A | 1/2000 | Chau et al. |
| 6,014,386 A | 1/2000 | Abraham |
| 6,014,431 A | 1/2000 | McHale et al. |
| 6,021,158 A | 2/2000 | Schurr et al. |
| 6,026,150 A | 2/2000 | Frank |
| 6,026,160 A | 2/2000 | Staber et al. |
| 6,028,867 A | 2/2000 | Rawson et al. |
| 6,029,047 A | 2/2000 | Ishida et al. |
| 6,032,057 A | 2/2000 | Kiiski |
| 6,038,300 A | 3/2000 | Hartmann et al. |
| 6,038,425 A | 3/2000 | Jeffrey |
| 6,040,759 A | 3/2000 | Sanderson |
| 6,047,055 A | 4/2000 | Carkner et al. |
| 6,049,531 A | 4/2000 | Roy |
| 6,052,380 A | 4/2000 | Bell |
| 6,055,242 A | 4/2000 | Doshi et al. |
| 6,055,268 A | 4/2000 | Timm et al. |
| 6,055,435 A | 4/2000 | Smith et al. |
| 6,061,357 A | 5/2000 | Olshansky et al. |
| 6,061,392 A | 5/2000 | Bremer et al. |
| 6,064,422 A | 5/2000 | Goolcharan et al. |
| 6,069,879 A | 5/2000 | Chatter |
| 6,069,890 A | 5/2000 | White et al. |
| 6,069,899 A | 5/2000 | Foley |
| 6,072,810 A | 6/2000 | Van der Putten et al. |
| 6,075,784 A | 6/2000 | Frankel et al. |
| 6,075,787 A | 6/2000 | Bobeck et al. |
| 6,079,779 A | 6/2000 | Tzannes et al. |
| 6,081,519 A | 6/2000 | Petler |
| 6,087,860 A | 7/2000 | Liu et al. |
| 6,088,368 A | 7/2000 | Rubinstain et al. |
| 6,091,932 A | 7/2000 | Langlais |
| 6,094,441 A | 7/2000 | Jung et al. |
| 6,097,801 A | 8/2000 | Williams et al. |
| 6,101,341 A | 8/2000 | Manabe |
| 6,107,912 A | 8/2000 | Bullock et al. |
| 6,111,595 A | 8/2000 | Hertrich |
| 6,111,936 A | 8/2000 | Bremer |
| 6,114,970 A | 9/2000 | Kirson et al. |
| 6,115,755 A | 9/2000 | Krishan |
| 6,128,471 A | 10/2000 | Quelch et al. |
| 6,130,879 A | 10/2000 | Liu |
| 6,130,893 A | 10/2000 | Whittaker et al. |
| 6,134,235 A | 10/2000 | Goldman et al. |
| 6,134,308 A | 10/2000 | Fallon et al. |
| 6,137,865 A | 10/2000 | Ripy et al. |
| 6,137,866 A | 10/2000 | Staber et al. |
| 6,141,330 A | 10/2000 | Akers |
| 6,141,339 A | 10/2000 | Kaplan et al. |
| 6,141,356 A | 10/2000 | Gorman |
| 6,144,399 A | 11/2000 | Manchester et al. |
| 6,148,006 A | 11/2000 | Dyke et al. |
| 6,154,465 A | 11/2000 | Pickett |
| 6,157,292 A | 12/2000 | Piercy et al. |
| 6,160,880 A | 12/2000 | Allen |
| 6,161,134 A | 12/2000 | Wang et al. |
| 6,167,043 A | 12/2000 | Frantz |
| 6,169,795 B1 | 1/2001 | Dunn et al. |
| 6,178,161 B1 | 1/2001 | Terry |
| 6,181,715 B1 | 1/2001 | Phillips et al. |
| 6,181,775 B1 | 1/2001 | Bella |
| 6,186,826 B1 | 2/2001 | Weikle |
| 6,192,399 B1 | 2/2001 | Goodman |
| 6,195,706 B1 | 2/2001 | Scott |
| 6,202,211 B1 | 3/2001 | Williams, Jr. |
| 6,205,202 B1 | 3/2001 | Yoshida et al. |
| 6,208,637 B1 | 3/2001 | Eames |
| 6,212,204 B1 | 4/2001 | Depue |
| 6,212,227 B1 | 4/2001 | Ko et al. |
| 6,215,789 B1 | 4/2001 | Keenan et al. |
| 6,215,799 B1 | 4/2001 | Mitchell et al. |
| 6,215,855 B1 | 4/2001 | Schneider |
| 6,216,160 B1 | 4/2001 | Dichter |
| 6,229,818 B1 | 5/2001 | Bell |
| 6,236,653 B1 | 5/2001 | Dalton et al. |
| 6,239,672 B1 | 5/2001 | Lutz, Jr. et al. |
| 6,240,091 B1 | 5/2001 | Ginzboorg et al. |
| 6,240,166 B1 | 5/2001 | Collin et al. |
| 6,243,394 B1 | 6/2001 | Deng |
| 6,243,571 B1 | 6/2001 | Bullock et al. |
| 6,246,695 B1 | 6/2001 | Seazholtz et al. |
| 6,246,716 B1 | 6/2001 | Schneider |
| 6,252,755 B1 | 6/2001 | Willer |
| 6,259,676 B1 | 7/2001 | Kellock et al. |
| 6,259,775 B1 | 7/2001 | Alpert et al. |
| 6,266,348 B1 | 7/2001 | Gross et al. |
| 6,272,209 B1 | 8/2001 | Bridger et al. |
| 6,272,219 B1 | 8/2001 | De Bruycker et al. |
| 6,278,769 B1 | 8/2001 | Bella |
| 6,282,238 B1 | 8/2001 | Landry |
| 6,282,277 B1 | 8/2001 | DeBalko |
| 6,286,049 B1 | 9/2001 | Rajakarunanayake et al. |
| 6,288,334 B1 | 9/2001 | Hennum |
| 6,292,467 B1 | 9/2001 | Keller |
| 6,292,517 B1 | 9/2001 | Jeffress et al. |
| 6,298,037 B1 | 10/2001 | Sharifi |
| 6,301,337 B1 | 10/2001 | Scholtz et al. |
| 6,310,894 B1 | 10/2001 | Counterman |
| 6,310,909 B1 | 10/2001 | Jones |
| 6,310,940 B1 | 10/2001 | Ratz |
| 6,314,102 B1 | 11/2001 | Czerwiec et al. |
| 6,317,884 B1 | 11/2001 | Eames et al. |
| 6,320,900 B1 | 11/2001 | Liu |
| 6,324,268 B1 | 11/2001 | Balachandran et al. |
| 6,329,937 B1 | 12/2001 | Harman |
| 6,334,219 B1 | 12/2001 | Hill et al. |
| 6,339,594 B1 | 1/2002 | Civanlar et al. |
| 6,345,047 B1 | 2/2002 | Regnier |
| 6,346,964 B1 | 2/2002 | Rogers et al. |
| 6,349,098 B1 | 2/2002 | Parruck et al. |
| 6,349,133 B1 | 2/2002 | Matthews et al. |
| 6,353,629 B1 | 3/2002 | Pal |
| 6,359,906 B1 | 3/2002 | Dyke et al. |
| 6,370,149 B1 | 4/2002 | Gorman et al. |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,393,050 B1 | 5/2002 | Liu |
| 6,396,391 B1 | 5/2002 | Binder |
| 6,396,393 B2 | 5/2002 | Yuasa |
| 6,396,837 B1 | 5/2002 | Wang et al. |
| 6,400,815 B1 | 6/2002 | Gilboy et al. |
| 6,404,773 B1 | 6/2002 | Williams et al. |
| 6,404,861 B1 | 6/2002 | Cohen et al. |
| 6,405,027 B1 | 6/2002 | Bell |
| 6,414,952 B2 | 7/2002 | Foley |
| 6,424,661 B1 | 7/2002 | Bentley |
| 6,426,942 B1 | 7/2002 | Sienel et al. |
| 6,427,237 B1 | 7/2002 | Aranguren et al. |
| 6,430,199 B1 | 8/2002 | Kerpez |
| 6,434,123 B1 | 8/2002 | Park |
| 6,438,109 B1 | 8/2002 | Karaoguz et al. |
| 6,442,195 B1 | 8/2002 | Liu et al. |
| 6,445,087 B1 | 9/2002 | Wang et al. |

(56) References Cited

U.S. PATENT DOCUMENTS

| | | |
|---|---|---|
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,625 B1 | 9/2002 | Itoi |
| 6,456,714 B2 | 9/2002 | Shima et al. |
| 6,459,692 B1 | 10/2002 | Ben-Michael et al. |
| 6,466,572 B1 | 10/2002 | Ethridge et al. |
| 6,470,053 B1 | 10/2002 | Liu |
| 6,473,495 B1 | 10/2002 | Willer |
| 6,477,595 B1 | 11/2002 | Cohen et al. |
| 6,480,510 B1 | 11/2002 | Binder |
| 6,483,902 B1 | 11/2002 | Stewart et al. |
| 6,483,903 B1 | 11/2002 | Itay et al. |
| 6,490,273 B1 | 12/2002 | DeNap et al. |
| 6,493,325 B1 | 12/2002 | Hjalmtysson et al. |
| 6,493,875 B1 | 12/2002 | Eames et al. |
| 6,507,647 B1 | 1/2003 | Mandalia |
| 6,519,291 B1 | 2/2003 | Dagdeviren et al. |
| 6,522,352 B1 | 2/2003 | Strandwitz et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,539,011 B1 | 3/2003 | Keenan et al. |
| 6,542,465 B1 | 4/2003 | Wang |
| 6,546,024 B1 | 4/2003 | Sharper et al. |
| 6,546,098 B1 | 4/2003 | Henderson |
| 6,549,616 B1 | 4/2003 | Binder |
| 6,556,564 B2 | 4/2003 | Rogers |
| 6,556,581 B1 | 4/2003 | He et al. |
| 6,560,225 B1 | 5/2003 | Czajkowski et al. |
| 6,560,319 B1 | 5/2003 | Binder |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,580,710 B1 | 6/2003 | Bowen et al. |
| 6,580,727 B1 | 6/2003 | Yim et al. |
| 6,580,785 B2 | 6/2003 | Bremer et al. |
| 6,584,122 B1 | 6/2003 | Matthews et al. |
| 6,584,148 B1 | 6/2003 | Zitting et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,597,732 B1 | 7/2003 | Dowling |
| 6,600,734 B1 | 7/2003 | Gernert et al. |
| 6,603,808 B1 | 8/2003 | Anne et al. |
| 6,608,894 B1 | 8/2003 | Armenta |
| 6,611,537 B1 | 8/2003 | Edens et al. |
| 6,611,798 B2 | 8/2003 | Bruhn et al. |
| 6,633,572 B1 * | 10/2003 | Olshansky et al. ........... 370/401 |
| 6,636,505 B1 | 10/2003 | Wang et al. |
| 6,639,913 B1 | 10/2003 | Frankel et al. |
| 6,657,994 B1 | 12/2003 | Rajakarunanayake |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,686,832 B2 | 2/2004 | Abraham |
| 6,690,677 B1 | 2/2004 | Binder |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,704,414 B2 | 3/2004 | Murakoshi |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,744,883 B1 | 6/2004 | Bingel et al. |
| 6,747,995 B1 | 6/2004 | Brown et al. |
| 6,747,996 B2 | 6/2004 | Holloway et al. |
| 6,751,212 B1 | 6/2004 | Kaji et al. |
| 6,751,229 B1 | 6/2004 | Waller et al. |
| 6,754,186 B1 | 6/2004 | Bullman |
| 6,754,235 B2 | 6/2004 | Van Der Putten et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,763,097 B1 | 7/2004 | Vitenberg |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,269 B1 | 8/2004 | Kaczmarczyk et al. |
| 6,778,549 B1 | 8/2004 | Keller |
| 6,778,646 B1 | 8/2004 | Sun |
| 6,778,817 B1 | 8/2004 | Bullock et al. |
| 6,785,296 B1 | 8/2004 | Bell |
| 6,788,782 B1 | 9/2004 | Fotsch et al. |
| 6,792,323 B2 | 9/2004 | Krzyzanowski et al. |
| 6,798,767 B1 | 9/2004 | Alexande et al. |
| 6,813,343 B1 | 11/2004 | Vitenberg |
| 6,816,512 B2 | 11/2004 | Lazarus et al. |
| 6,819,760 B1 | 11/2004 | Nayler |
| 6,823,047 B1 | 11/2004 | Cruickshank |
| 6,826,174 B1 | 11/2004 | Erekson et al. |
| 6,831,975 B1 | 12/2004 | Easwaran et al. |
| 6,834,057 B1 | 12/2004 | Rabenko et al. |
| 6,836,546 B1 | 12/2004 | Willer |
| 6,839,345 B2 | 1/2005 | Lu et al. |
| 6,842,426 B2 | 1/2005 | Bogardus et al. |
| 6,842,459 B1 | 1/2005 | Binder |
| 6,847,718 B1 | 1/2005 | Hiraoka |
| 6,853,724 B2 | 2/2005 | Wang |
| 6,856,616 B1 | 2/2005 | Schuster et al. |
| 6,862,353 B2 | 3/2005 | Rabenko et al. |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,876,648 B1 | 4/2005 | Lee |
| 6,882,714 B2 | 4/2005 | Mansfield |
| 6,886,181 B1 | 4/2005 | Dodds et al. |
| 6,891,881 B2 | 5/2005 | Trachewsky et al. |
| 6,895,089 B2 | 5/2005 | Wang |
| 6,898,413 B2 | 5/2005 | Yip et al. |
| 6,904,134 B2 | 6/2005 | Jeon et al. |
| 6,904,149 B2 | 6/2005 | Keenum et al. |
| 6,909,725 B1 | 6/2005 | Chow |
| 6,912,209 B1 | 6/2005 | Thi et al. |
| 6,922,407 B2 | 7/2005 | Wu |
| 6,925,089 B2 | 8/2005 | Chow et al. |
| 6,927,340 B1 | 8/2005 | Binder et al. |
| 6,934,754 B2 | 8/2005 | West et al. |
| 6,937,056 B2 | 8/2005 | Binder |
| 6,940,918 B1 | 9/2005 | Nayler et al. |
| 6,941,364 B2 | 9/2005 | Kim et al. |
| 6,947,736 B2 | 9/2005 | Shaver et al. |
| 6,956,826 B1 | 10/2005 | Binder |
| 6,961,303 B1 | 11/2005 | Binder |

(56) References Cited

U.S. PATENT DOCUMENTS

| | | | |
|---|---|---|---|
| 6,963,559 B2 | 11/2005 | Elo | |
| 6,975,713 B1 | 12/2005 | Smith et al. | |
| 6,977,923 B1 * | 12/2005 | Hagebarth | 370/353 |
| 6,980,638 B1 | 12/2005 | Smith et al. | |
| 6,985,714 B2 | 1/2006 | Akiyama et al. | |
| 6,989,733 B2 | 1/2006 | Simonsen et al. | |
| 6,995,657 B2 | 2/2006 | Zalitzky et al. | |
| 6,996,134 B1 | 2/2006 | Renucci et al. | |
| 6,996,213 B1 | 2/2006 | De Jong | |
| 6,996,729 B2 | 2/2006 | Volkening et al. | |
| 6,998,964 B2 | 2/2006 | Lomax, Jr. et al. | |
| 6,999,433 B2 | 2/2006 | Baum | |
| 7,002,898 B1 | 2/2006 | Lou | |
| 7,003,102 B2 | 2/2006 | Kiko | |
| 7,006,445 B1 | 2/2006 | Cole et al. | |
| 7,009,946 B1 | 3/2006 | Kardach | |
| 7,010,002 B2 | 3/2006 | Chow et al. | |
| 7,012,922 B1 | 3/2006 | Unitt et al. | |
| 7,016,377 B1 | 3/2006 | Chun et al. | |
| 7,020,130 B2 | 3/2006 | Krause et al. | |
| 7,027,566 B2 | 4/2006 | Bossemeyer, Jr. et al. | |
| 7,031,394 B2 | 4/2006 | Vitenberg | |
| 7,035,270 B2 | 4/2006 | Moore, Jr. et al. | |
| 7,050,546 B1 | 5/2006 | Richardson et al. | |
| 7,054,303 B2 | 5/2006 | Miyazaki et al. | |
| 7,054,442 B2 | 5/2006 | Weikle | |
| 7,058,174 B2 | 6/2006 | Posthuma | |
| 7,068,649 B2 | 6/2006 | Fisher et al. | |
| 7,068,668 B2 | 6/2006 | Feuer | |
| 7,068,682 B2 | 6/2006 | Campbell et al. | |
| 7,082,141 B2 | 7/2006 | Sharma et al. | |
| 7,085,238 B2 | 8/2006 | McBeath | |
| 7,088,238 B2 | 8/2006 | Karaoguz et al. | |
| 7,095,849 B2 | 8/2006 | Smith et al. | |
| 7,099,368 B2 | 8/2006 | Santhoff et al. | |
| 7,106,721 B1 | 9/2006 | Binder | |
| 7,113,574 B1 | 9/2006 | Haas et al. | |
| 7,116,685 B2 | 10/2006 | Brown et al. | |
| 7,117,520 B2 | 10/2006 | Stewart | |
| 7,123,701 B2 | 10/2006 | Binder | |
| 7,133,423 B1 | 11/2006 | Chow et al. | |
| 7,142,560 B2 | 11/2006 | Mansfield | |
| 7,142,563 B1 | 11/2006 | Lin | |
| 7,142,934 B2 | 11/2006 | Janik | |
| 7,145,996 B2 | 12/2006 | Creamer et al. | |
| 7,149,182 B1 | 12/2006 | Renucci et al. | |
| 7,149,474 B1 | 12/2006 | Mikhak | |
| 7,154,996 B2 | 12/2006 | Strauss | |
| 7,162,013 B2 | 1/2007 | Gavette et al. | |
| 7,164,690 B2 | 1/2007 | Limb et al. | |
| 7,167,923 B2 | 1/2007 | Lo | |
| 7,171,506 B2 | 1/2007 | Iwamura | |
| 7,190,716 B2 | 3/2007 | Norrell et al. | |
| 7,194,639 B2 | 3/2007 | Atkinson et al. | |
| 7,199,706 B2 | 4/2007 | Dawson et al. | |
| 7,206,322 B1 | 4/2007 | Garg et al. | |
| 7,206,417 B2 | 4/2007 | Nathan | |
| 7,209,719 B2 | 4/2007 | Liebenow | |
| 7,209,945 B2 | 4/2007 | Hicks, III et al. | |
| 7,215,763 B1 | 5/2007 | Keller et al. | |
| 7,221,679 B2 | 5/2007 | Binder | |
| 7,239,627 B2 | 7/2007 | Nattkemper et al. | |
| 7,239,628 B1 | 7/2007 | Pendleton et al. | |
| 7,256,704 B2 | 8/2007 | Yoon et al. | |
| 7,257,106 B2 | 8/2007 | Chen et al. | |
| 7,263,362 B1 | 8/2007 | Young et al. | |
| 7,274,669 B2 | 9/2007 | Czerwiec et al. | |
| 7,283,554 B2 | 10/2007 | Ophir et al. | |
| 7,292,859 B2 | 11/2007 | Park | |
| 7,293,103 B1 | 11/2007 | Lin et al. | |
| 7,301,940 B1 | 11/2007 | Bernstein | |
| 7,305,006 B1 | 12/2007 | Bella | |
| 7,308,086 B2 | 12/2007 | Yoshitani | |
| 7,327,765 B1 | 2/2008 | Ojard | |
| 7,340,051 B2 | 3/2008 | Phillips et al. | |
| 7,346,071 B2 | 3/2008 | Bareis | |
| 7,382,786 B2 | 6/2008 | Chen et al. | |
| 7,408,949 B2 | 8/2008 | Baum | |
| 7,463,732 B1 * | 12/2008 | Hiscock et al. | 379/399.02 |
| 7,680,255 B2 | 3/2010 | Binder | |
| 7,738,453 B2 | 6/2010 | Binder | |
| 7,769,030 B2 * | 8/2010 | Binder | 370/401 |
| 8,238,328 B2 | 8/2012 | Binder | |
| 2001/0030950 A1 | 10/2001 | Chen et al. | |
| 2001/0038635 A1 | 11/2001 | Rogers | |
| 2001/0047418 A1 | 11/2001 | White | |
| 2002/0006137 A1 | 1/2002 | Rabenko et al. | |
| 2002/0035624 A1 | 3/2002 | Kim | |
| 2002/0037004 A1 | 3/2002 | Bossemeyer et al. | |
| 2002/0054601 A1 * | 5/2002 | Barraclough et al. | 370/401 |
| 2002/0061012 A1 | 5/2002 | Thi et al. | |
| 2002/0063924 A1 | 5/2002 | Kimbrough et al. | |
| 2002/0114325 A1 | 8/2002 | Dale et al. | |
| 2002/0128009 A1 | 9/2002 | Boch et al. | |
| 2002/0131422 A1 | 9/2002 | Chu et al. | |
| 2002/0144159 A1 | 10/2002 | Wu et al. | |
| 2002/0150100 A1 | 10/2002 | White et al. | |
| 2002/0154629 A1 | 10/2002 | Lohman et al. | |
| 2002/0176567 A1 | 11/2002 | Chen et al. | |
| 2002/0198952 A1 | 12/2002 | Bell | |
| 2003/0016794 A1 | 1/2003 | Brothers | |
| 2003/0048895 A1 | 3/2003 | Kiko et al. | |
| 2003/0067910 A1 | 4/2003 | Razazian et al. | |
| 2003/0088706 A1 | 5/2003 | Chan et al. | |
| 2003/0198246 A1 | 10/2003 | Lifshitz et al. | |
| 2003/0198341 A1 | 10/2003 | Smith et al. | |
| 2003/0204393 A1 | 10/2003 | Czerwiec et al. | |
| 2004/0006484 A1 | 1/2004 | Manis et al. | |
| 2004/0037317 A1 | 2/2004 | Zalitzky et al. | |
| 2004/0083262 A1 | 4/2004 | Trantow | |
| 2004/0087214 A1 | 5/2004 | Cho | |
| 2004/0090984 A1 | 5/2004 | Saint-Hilaire et al. | |
| 2004/0107299 A1 | 6/2004 | Lee et al. | |
| 2004/0136373 A1 | 7/2004 | Bareis | |
| 2004/0156513 A1 | 8/2004 | Kaylor et al. | |
| 2004/0170262 A1 | 9/2004 | Ohno | |
| 2004/0172658 A1 | 9/2004 | Rakib et al. | |
| 2004/0177167 A1 | 9/2004 | Iwamura et al. | |
| 2004/0180573 A1 | 9/2004 | Chen | |
| 2004/0204040 A1 | 10/2004 | Heijnen | |
| 2004/0208167 A1 | 10/2004 | Kishida | |
| 2004/0250273 A1 | 12/2004 | Swix et al. | |
| 2004/0268160 A1 | 12/2004 | Atkinson et al. | |
| 2005/0015805 A1 | 1/2005 | Iwamura | |
| 2005/0018766 A1 | 1/2005 | Iwamura | |
| 2005/0038875 A1 | 2/2005 | Park | |
| 2005/0047431 A1 | 3/2005 | Binder | |
| 2005/0063403 A1 | 3/2005 | Binder | |
| 2005/0076149 A1 | 4/2005 | McKown et al. | |
| 2005/0086694 A1 | 4/2005 | Hicks et al. | |
| 2005/0114325 A1 | 5/2005 | Liu et al. | |
| 2005/0150100 A1 | 7/2005 | Merdan et al. | |
| 2005/0226200 A1 | 10/2005 | Askildsen et al. | |
| 2006/0029210 A1 | 2/2006 | Feugere | |
| 2006/0140178 A1 | 6/2006 | Cheng et al. | |
| 2006/0153169 A1 | 7/2006 | Koifman et al. | |
| 2006/0193310 A1 | 8/2006 | Landry et al. | |
| 2006/0193313 A1 | 8/2006 | Landry et al. | |
| 2006/0215680 A1 | 9/2006 | Camagna | |
| 2006/0238250 A1 | 10/2006 | Camagna et al. | |
| 2006/0251094 A1 | 11/2006 | Van Vleck et al. | |
| 2006/0251159 A1 | 11/2006 | Huotari et al. | |
| 2006/0251179 A1 | 11/2006 | Ghoshal | |
| 2006/0280197 A1 | 12/2006 | Stone | |
| 2006/0291493 A1 | 12/2006 | Schley-May et al. | |
| 2007/0198748 A1 | 8/2007 | Ametsitsi et al. | |
| 2008/0140565 A1 | 6/2008 | DeBenedetti et al. | |
| 2008/0153415 A1 | 6/2008 | Block et al. | |

FOREIGN PATENT DOCUMENTS

| | | |
|---|---|---|
| JP | 11-122285 | 4/1999 |
| KR | 10-2001-0039732 | 5/2001 |

(56) References Cited

FOREIGN PATENT DOCUMENTS

| | | |
|---|---|---|
| WO | WO 00/07322 | 2/2000 |
| WO | WO 01/28215 A1 | 4/2001 |
| WO | WO 0128215 | 4/2001 |

OTHER PUBLICATIONS

Olshansky, "A Full Service Network for the Copper Plant", Telephony, 1985, pp. 52-60.
Instant Network Rules on Phone Lines, Electronic Design, 1987.
O. Agazzi, et al., "Large Scale Integration of Hybrid-Method Digital Subscriber Loops," IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques et Terminaux Audiovisuels Numeriques", L'Echo Des Recherches, No. 126, 1986, pp. 37-46.
H. Fuchs, et al., "Providing Full Duplex Transmission Over Two-Wire Subscriber Loops", Telephony, vol. 208, No. 11, Mar. 18, 1985, pp. 76, 77, 78 and 84.
H. Fukagavva, et al., "Bus Wiring System for Residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modem Simplifies Voice and Data Networking", Mini-Micro Systems, vol. 17, No. 3, Mar. 1984, 4 pages.
R. Murakoshi, "Home Automation", Journal of the Society of Instrument and Control Engineers, vol. 23, No. 11, Nov. 1984, pp. 955-958.
R.D. Nash, et al., "Simultaneous Transmission of Speech and Data Over an Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.
H. Ogiwara, et al., Design Philosophy and Hardware Implementation for Digital Subscriber Loops, IEEE Transactions on Communications, vol. COM-30, No. 9, Sep. 1982, pp. 2057-2065.
J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.
R.A. Tatum, "Project Victoria—the 7-in-1 Solution", Telephone Engineer and Management, vol. 90, No. 1, Jan. 1, 1986, pp. 47 and 50.
A. Teshima, et al., "Still Video Telecommunication Over the Analog Telephone Network", Journal of the Institute of Television Engineers of Japan, vol. 42, No. 11, Nov. 1988, pp. 1162-1167.
S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.
T. Tsuda, et al., "Experimental In-House Multiservice Communication System", Fujitsu Scientific and Technical Journal, vol. 16, No. 3, Sep. 1980, pp. 29-45.
K. Urui, "Integrated Voice/Data Digital EPBX", Toshiba Review, No. 150, Winter 1984, pp. 30-33.
A.F. Van Den Berg, et al., "Principles van de Modem: Technieken on Specificaties", Elektronica, vol. 32, No. 5, Mar. 9, 1984, pp. 11, 13, 15, 17, 19 and 21.
M.G. Vry, et al., "Digital 1+1 Systems for Local Network Enhancement", Conference on Communications Equipment and Systems. Apr. 20-22, 1982, Birmingham, United Kingdom, pp. 61-64.
M.G. Vry, et al., "The Design of a 1+1 System for Digital Signal Transmission to the Subscriber", NTG-Bachberichte, vol. 73, 1980, pp. 36-40.
J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.
K. Yamamoto, "A Home Terminal System Using the Home Area Information Network", IEEE Transactions on Consumer Electronics, vol. CE-30, No. 4, Nov. 1984, pp. 608-616.
"Centrex LAN Can Provide Advanced Network Capabilities Over the Existing Telephone Wires", Communications News, vol. 25, No. 6, Jun. 1988, p. 27.
"Data Over Voice is Solution for Corporate Network", Telephone Engineer and Management, vol. 91, No. 9, May 1, 1987, pp. 67-69.
"Data Carrier System Allows Simultaneous Voice/Data Transmission for PABX Telephone Systems", Computer Design, vol. 21, No. 5, May 1982, pp. 68 and 70.
"Computerized Telephone System Integrates Voice and Data Switching", Computer Design, vol. 20, No, 4, Apr. 1981, 6 pages.
"AT&T's Systemax Premises Distribution System Solves Networking Problems", Fiber Optics Magazine, vol. 12, No. 4, Jul.-Aug. 1990, pp. 14-16.
M.M. Anderson, "Video Services on Copper", Conference: ICC 91, International Conference on Communications Conference Record, Jun. 2-26, 1991, Denver, CO, pp. 302-306.
M. Bastian, "Voice-Data Integration: An Architecture Perspective," IEEE Communications Magazine, vol. 24, No. 7, Jul. 1986, pp. 8-12.
M. Boubekker, "Bandwidth Reduction for the Transmission of Sign Language Over Telephone Lines", Proceedings of the SPIE—The International Society for Optical Engineering, vol. 1001, Part. 1, 1988, pp. 223-230.
S. Bramblett, "Connect Terminals to Your CPU Over PBX Telephone Lines", EDN, vol. 31, No. 5, Mar. 6, 1986, pp. 239-243, 245, 246 and 248.
"TeleConcepts . . . Introduces the Just Plug It in Intercom System,"TeleConcepts Brochure, Newington, CT, 2 pages, published before Jul. 3, 1995.
Ascend DSLPipe-S Specifications; copyright 1997, (2 pages).
TeleVideo Brochure, 2 pages, published before Jul. 3, 1995.
J. Hofmann, Cable, Television, and the Consumer Electronic Bus, Symposium Record, 15th International TV Symposium, Jun. 11, 1987, Montreux, Switzerland, 9 pages.

(56) References Cited

OTHER PUBLICATIONS

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page, 1998.
"Video Transmission System—Send Video Over Ordinary Wire—No Coax Required", Javelin Brochure, 2 pages, published before Jul. 3, 1995.
C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.
Grayson Evans, The CEBUs Standard User's Guide, 1st edition, May 1996, 317 pages.
Mark Hachman, Compaq to Ride the CEBus, EBN, Jan. 22, 1996, 1 page.
Home Automation Buses: Protocols Really Hit Home, EDN, Apr. 13, 1995, 9 pages.
Brian E. Markwalter, et al; CEBus Router Testing, IEEE Transactions on Consumer Electronics, Nov. 1991, vol. 37, No. 4, 8 pages.
Draft IS-60.04 Node Communications Protocol Part 6: Application Layer Specification, Rev. Apr. 18, 1996, 129 pages.
G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.
C. Dougligeris, et al., "Communications and Control for a Home Automation System", Conference: IEEE Proceedings of the Southeastcon '91, vol. 1, pp. 171-175.
D.G.J. Fanshawe, "Architures for Home Systems", Conference: IEEE Colloquium on Home Systems—Information, Entertainment and Control, Oct. 1, 1990, London, United Kingdom, pp. 3/1-3/3.
N.C. Hightower, "Integrated Voice, Data and Video in the Local Loop", IEEE 1986, pp. 915-919.
M. Inoue, et al., "A Home Automation System", IEEE Transactions on Consumer Electronics, vol. CE-31, No. 3, Aug. 1985, pp. 516-527.
S. Motoyama, et al., "A Subscriber Loop Multiplexing System for Integrated Service Digital Networks", Conference: NTC '81, IEEE 1981 National Telecommunications Conference, Innovative Telecommunications—Key to the Future, Nov. 29-Dec. 3, 1981, New Orleans, Louisiana, pp. D5.1.1-D5.1.5.
G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.
H. Nishi, et al., "Control of a Star/Bus Key Telephone System", NTT R & D, vol. 39, No. 8, 1990, pp. 122, 1222, 1224-1228.
A. Pietrasik, et al., "Subscriber Carrier Telephony System 1+1", Wiadomosci Telekomunikacyjne, vol. 17, No. 7-8, Jul.-Aug. 1977, pp. 183-198.
V. Punj, "Broadband Applications and Services of Public Switched Networks", IEEE Transactions on Consumer Electronics, vol. 35, No. 2, May 1989, pp. 106-112.
T. Sodeyama, et al., "Intelligent House", Journal of the Institute of Electronics, Information and Communication Engineers, vol. 72, No. 9, Sep. 1989, pp. 1024-1026.
H. Tanaka, et al., "Telecontrol System VJ-501", National Technical Report, vol. 32, No. 6, Dec. 1986, pp. 809-817.
D. L. Waring, "The Asymmetrical Digital Subscriber Line (ADSL): A New Transport Technology for Delivering Wideband Capabilities to the Residence", Globecom '91, IEEE, pp. 1979-1986.
K. Yamamoto, et al., "New Home Telephone System Using Japanese Home Bus System Standard," IEEE Transactions on Consumer Electronics, vol. 35, No. 3, Aug. 1989, pp. 687-697.
T. Yamazakli, et al., "Home Appliance Technologies," NEC Research and Development, No. 96, Mar. 1990, pp. 292-299.
Funkschau, "CEBus: US Households are Being Networked", No. 9, Apr. 1989, pp. 45-47.
"Shared Services (Data/Voice Network)", Communications News, vol. 25, No. 11, Nov. 1988, pp. 46-47.
Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).
A. Artom, et al., "The Possible Use of Customer Loop for New Services During the Transition From Analogue to Digital", Revue F.I.T.C.E., Mar.-Apr. 1981, vol. 20, No. 2, pp. 50-56.
A. Artom, et al., "Medium-Term Prospects for New Servies to the Telephone Customers," Conference Record, Jun. 14-18, 1981, Int'l Conf. on Communications, Denver, CO., pp. 14.4.1-14.4-6.
Hoe-Young Noh, "Home Automation", Korea Information Science Society Review, Apr. 1989, vol. 7 No. 2, pp. 40-44, Republic of Korea. (Translation Provided).
M. Coronaro, et al., "Integrated Office Communication System," Electrical Communication, 1986, pp. 17-22, vol. 60, No. 1, FACE Research Center, Pomezia, Italy.
Chow, et al., "A Multi-drop In-House ADSL Distribution Network"; IEEE 1994, pp. 456-460.
English Language Abstract for Japanese Patent 1-27358 (64-27358) Jan. 30, 1989.
Bellcore: Request for Information: Asymmetrical Digital Subscriber Line (ADSL) Systems That Support Simplex High-Bit-Rate Access and POTS in the Copper Loop Plant; Jun. 1991.
Twisted Pair Physical Layer and Medium Specification; Revision: IS-60 Aug. 18, 1995 (49 pages).
Introduction to the CEBus Standard; Revision Feb. 5, 1995 Draft (19 pages).
Compaq to Ride The CEBus; by Mark Hachman, EBN Jan. 22, 1996 (1 page).
CEBus Router Testing; IEEE Transactions on Consumer Electronics Nov. 1991, vol. 37 No. 4 (8 pages).
Broadband Network Technology—An Overview for the Data and Telecommunications Industries; by Edward Cooper, Copyright 1984, p. 51-52 (4 pages).
Technical Report TR-001 ADSL Forum System Reference Model; May 1996 (6 pages).
DSLPipe User's Guide; by Ascend Communications, Jun. 3, 1997 (245 pages).
DSLPipe Reference Guide; by Ascend Communications, Jun. 2, 1997 (162 pages).
Ascend DSLPipe-S Features; Posted May 12, 1997 (2 pages).
Broadband Digital Subscriber Line—A Full Service Network for the Copper Plant; Telephony / Jun. 12, 1995, vol. 228 No. 24 (8 pages).
Commtek Intros Video over UTP; Communications Week, Feb. 10, 1992 (3 pages).
Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages (s), None.
"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0 , Hewlett Packard Laboratories, Bristol, U.K., Oct. 17, 2001.
Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
21145 Phoneline/Ethernet LAN Controller, Intel Corporation . COPYRGT. 1999, http://developer.intel.com/design/network/21145.htm.
Simple, High-Speed Ethernet Technology for the Home, White Paper, Home Phoneline Networking Alliance, Jun. 1998, pp. 1-11.
Information on Home PhoneLine Networking Alliance (Home PNA), dated Jun. 1998 and before.

* cited by examiner

FIG. 3 (PRIOR-ART)

TELEPHONE OUTLET WITH PACKET TELEPHONY ADAPTER, AND A NETWORK USING SAME

CROSS-REFERENCE TO RELATED APPLICATION

This is a continuation of copending parent application Ser. No. 11/001,057, filed on Dec. 2, 2004, which is a continuation of copending parent application Ser. No. 10/469,576, nationalized on Sep. 2, 2003, which copending parent application is the national stage of international application PCT/IL01/00954, filed on Oct. 15, 2001, the disclosure of which is incorporated herein by reference.

FIELD OF THE INVENTION

The present invention relates to the field of packet telephony, and, more specifically, to the use of packet telephony within a Local Area Network (LAN) over wiring simultaneously used for analog telephony.

BACKGROUND OF THE INVENTION

Analog Telephone Network

Analog telephony, popularly known as "Plain Old Telephone Service" ("POTS") has been in existence for over 100 years, and is well-designed and well-engineered for the transmission and switching of voice signals in the 3-4 KHz portion (or "band") of the audio spectrum. The familiar POTS network supports real-time, low-latency, high-reliability, moderate-fidelity voice telephony, and is capable of establishing a session between two end-points, each using an analog telephone set.

The terms "computer" and "personal computer" ("PC") as used herein include workstations and other data terminal equipment (DTE) with interfaces for connection to a local area network. The term "telephone set" as used herein includes any device which can connect to a Public Switch Telephone Network ("PSTN") using analog telephone signals, non-limiting examples of which are fax machines, automatic telephone answering machines, and dial-up modems.

Outlets

The term "outlet" herein denotes an electro-mechanical device, which enables connection to wiring installed within a building. Outlets are permanently connected to the wiring, and allow easy connection of external units as required to such wiring, commonly by means of an integrated, built-in connector. The outlet is normally mechanically attached to, or mounted in, the wall. Non-limiting examples of common outlets include: telephone outlets for connecting telephone sets; CATV outlets for connecting television sets, VCR's, and the like; and electrical outlets for connecting power to electrical appliances.

LAN Environment

A development associated with the Internet is packet telephony. Packet telephony involves the use of a packet based network (commonly using the Internet Protocol, or IP) for communicating telephonic and related data, which may include sound, images, motion pictures, multimedia and any combinations thereof, in addition to voice content. In place of a pair of telephones connected by switched telephone lines as in analog telephony, packet telephony typically involves the use of an IP-telephone at one or both ends of the telephony link, with the telephonic information transferred over a packet network using packet switching and packet routing techniques, as exemplified by the Internet.

Recently, a solution for combining both telephony and data communications into a single network is offered by the Voice-Over-Internet-Protocol (VoIP) approach. In this technique, telephone signals are digitized and carried as data across the LAN. Such systems are known in the art.

FIG. 1 shows a typical LAN-based telephony environment 10. Such a network, commonly using 10 BaseT or 100 BaseTX Ethernet IEEE802.3 interfaces and topology uses a hub 11 as a concentrating device, into which all devices are connected. Devices are connected to hub 11 by data connectors 14a, 14b, and 14c, which are housed within network outlets 15a, 15b, and 15c respectively via cables 13a, 13b, and 13c respectively. Data connectors 14a, 14b, and 14c may be, for example, type RJ-45; and cables 13a, 13b, and 13c may be, for example, Category 5 cabling. The telephony portion of network 10 uses IP telephones 17a, 17b, and 17c, which connect to network connectors 14a, 14b, and 14c via cables 16a, 16b, and 16c, respectively. A server 12 may also be connected to hub 11, and can perform the IP-PBX functionality, as well as other server functions as applied in the art.

Although FIG. 1 refers to the hub 11 as a concentrating device, it is understood that any type of device having multiple network interfaces and supporting a suitable connectivity can be used, non-limiting examples of which include a shared hub, switch (switched hub), router, and gateway. Hence, the term "hub" used herein denotes any such device. Furthermore, the hub 11 can be any packet based network, either in-building or distributed, such as LAN or the Internet.

In order to employ VoIP in network 10, specific IP telephones 17a, 17b, and 17c must be used. Such telephones are expensive, require connection to a power outlet (or other power supply) and are not yet common in the marketplace. This factor has encouraged the availability of adapters for bridging between IP networks and PSTN equipment. Specifically, adapters enabling the usage of POTS telephone sets in an IP environment are available in the market, allowing the use of common and low-price legacy POTS telephone sets to be used in a VoIP environment.

FIG. 2 shows a network 20 using POTS telephone sets in a VoIP environment. Basically, network 20 uses the same network infrastructure as network 10 (FIG. 1). However, instead of IP telephones 17a, 17b, and 17c, POTS telephone sets 22a, 22b, and 22c are used, connected via cables 6a, 6b and 6c respectively to VoIP/PSTN adapters 21a, 21b, and 21c, respectively, which in turn are respectively connected to network outlets 15a, 15b, and 15c via cables 22a, 22b, and 22c respectively. Such a configuration affords the benefits of IP telephony, but allows the use of common and inexpensive POTS telephone sets.

Although network 20 facilitates the employment of common, low-cost standard legacy POTS telephone sets, adapters 21a, 21b, and 21c are necessary, making installation and maintenance complex, and requiring additional equipment, connections, and cables (e.g. cables 22). Furthermore, such adapters require a power connection, further complicating installation, use, and maintenance.

Furthermore, although FIG. 1 and FIG. 2 show networks which are used solely for telephony, LANs today are intended and used principally for data communication, to connect Data Terminal Equipment (DTE) devices (such as desktop personal computers, printers). In some cases, the number of outlets 15 (or connectors 14) may not suffice for both telephony and data applications. For example, this may be the case in an office where each work area has a single network connection via a single outlet 15 having single connector 14. In this case, a hub (or other multi-port unit) must be connected to expand to multiple network connections. FIG. 3 shows such a configuration in a prior-art network 30. In order to allow both adapter 21a and DTE 7a to share network outlet 15a via connector 14a, a huh 31a is added. Similarly, a hub 31c is added, facilitating the connection of both adapter 21c and DTE 7c to a single network connection via outlet 15c via connector 14c. Thus, in such a configuration, additional hubs 31a and 31c must be added, introducing additional complexity in installation and maintenance.

Home Networking

In-home telephone service usually employs two or four wires, to which telephone sets are connected via telephone outlets.

FIG. 4 shows the wiring configuration of a prior-art telephone system including a network 40 for a residence or other building, wired with a telephone line 5. The telephone line 5 consists of single wire pair which connects to a junction-box 34, which in turn connects to a Public Switched Telephone Network (PSTN) 410 via a cable 33, terminating in a public switch 32, which establishes and enables telephony from one telephone to another. The term "analog telephony" herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" herein denotes, without limitation, any apparatus for telephony (including both analog telephony and ISDN), as well as any device using telephony signals, such as fax, voice-modem, and so forth.

The junction box 34 is used to separate the in-home circuitry from the PSTN and is used as a test facility for troubleshooting as well as for new wiring in the home. A plurality of telephones may connect to telephone lines 5 via a plurality of telephone outlets 35a, 35b, 35c, and 35d. Each outlet has a connector (often referred to as a "jack"), denoted in FIG. 4 as 36a, 36b, 36c, and 36d, respectively. In North-America, RJ-11 is commonly used for a jack. Each outlet may be connected to a telephone unit via a "plug" connector that inserts into the jack.

Network 40 is normally configured into a serial or "daisy-chained" topology, wherein the wiring is connected from one outlet to the next in a linear manner, but other topologies such as star, tree, or any arbitrary topology may also be used. Regardless of the topology, however, the telephone wiring system within a residence always uses wired media: two or four copper wires along with one or more outlets which provide direct access to these wires for connecting to telephone sets.

It is often desirable to simultaneously use existing telephone wiring simultaneously for both telephony and data networking. In this way, establishing a new local area network in a home or other building is simplified, because there is no need to install additional wiring. U.S. Pat. No. 4,766,402 to Crane (hereinafter referred to as "Crane") teaches a Local Area Network over standard two-wire telephone lines, but does not simultaneously support telephony.

As another example, relevant prior-art in this field is disclosed in U.S. Pat. No. 5,896,443 to Dichter (hereinafter referred to as "Dichter"). Dichter suggests a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

In addition to illustrating a residential telephone system, FIG. 4 also shows the arrangement of a Dichter network. Network 40 serves both analog telephones and provides a local area network of data units. Data Terminal Equipment (DTE) units 7a, 7b, and 7c are connected to the local area network via Data Communication Equipment (DCE) units 39a, 39b, and 39c, respectively. Examples of Data Communication Equipment include, but are not limited to, modems, line drivers, line receivers, and transceivers (the term "transceiver" herein denotes a combined transmitter and receiver), which enables communication over telephone line 5. DCE units 39a, 39b, and 39c are respectively connected to high pass filters (HPF) 38a, 38b, and 38c, which allow access to the high-frequency band carried by telephone line 5. In order to avoid interference to the data network caused by the telephones, low pass filters (LPF's) 37a, 37b, and 37c are added to isolate the POTS carrying band, so that telephones 22a, 22b, and 22c connects to telephone line 5 for providing PSTN. Furthermore, a low pass filter may also connected to Junction Box 34 (not shown in the figure), in order to filter noise induced from or to PSTN wiring 33.

FIG. 5 shows a telephone line-based LAN 50 wherein the data network is used for carrying both VoIP telephony and regular DTE network data. Flubs 31a, 31b, and 31c allow connecting respective DTE units 7a, 7b, and 7c as well as respective IP telephones 17a, 17b, and 17c to respective single network connections via DCE units 39a, 39b, and 39c. Analog telephones 22a, 22b, and 22c are also shown connected via respective low pass filters (LPF's) 37a, 37b, and 37c to the telephone outlets 35a, 35c, 35d. Thus, the analog telephones are connected directly to the analog telephone line 5.

In order to eliminate the need for IP telephones 17a, 17b, and 17c, and to permit using analog telephone sets 22a, 22b, and 22c instead, adapters 21a, 21b, and 21c (FIG. 3) must be added, as described previously. FIG. 6 shows a network 60, where this is done. IP telephones 17a, 17b, and 17c of network 50 are replaced by analog telephone sets 22d, 22e, and 22f, respectively, connected to hubs 41a, 41b, and 41c, respectively, via adapters 21a, 21b, and 21c respectively.

FIG. 6 demonstrates the complexity of such a configuration. At least three types of external devices are required: DCE units 39a, 39b, and 39c; hubs 41a, 41b, and 41c; and adapters 21a, 21b, and 21c. Each of these devices usually requires a separate power connection, which adds to the complexity of the connections. Thus, such a network is complex and difficult to install, operate, and maintain. In the prior art, it is suggested to integrate the DCE, HPF, and LPF components into outlets 35a, 35b, and 35c. Nevertheless, external hubs 41a, 41b, and 41c, as well as adapters 21a, 21b, and 21c still impose additional complexity in such a network.

There is thus a widely recognized need for, and it would be highly advantageous to have, a means for allowing the use of analog (POTS) telephone sets in LAN/VoIP environments without requiring additional external devices and allowing easy installation, operation, and maintenance. This goal is met by the present invention.

SUMMARY OF THE INVENTION

The present invention makes it easy and convenient to use analog ("POTS") telephone sets in a packet telephony environment, including, but not limited to, IP telephony via VoIP technology. The invention provides an outlet for a Local Area Network (LAN), with an integrated analog/VoIP adapter. The outlet has a standard analog telephone jack (e.g. RJ-11 in North America) allowing an analog telephone set to be directly connected to, and used with, a packet telephony system.

In a first embodiment, an outlet according to the present invention is used with an ordinary LAN environment, such as Ethernet 10 BaseT (IEEE802.3). The outlet allows connecting analog telephone sets to the LAN via the integrated analog/VoIP adapter, supports analog telephony over the LAN media, and can also support a standard network data connection using an integrated multi-port unit (e.g. hub, switch, or router). For standard network data connections, the outlet also includes a data networking jack (e.g. RJ-45 if 10 BaseT or 100 BaseTX is used) connected to a port.

In another embodiment, the outlet enables a LAN to be based on in-building telephone wiring, in a home or Small Office/Home Office (SoHo) environment. A packet-based LAN is implemented, and outlets according to the present invention serve as both telephone outlets and network outlets. This allows for direct and convenient connection of analog telephone sets to VoIP packet telephony over the data network. In such an arrangement, the regular analog telephony service remains unaffected, because the low-frequency analog portion of the spectrum is isolated by the FDM technique. As noted above, the outlet may also support a network data connection, using an integrated multi-port unit (e.g. hub, switch or router), and in this case also includes a data network jack (e.g. RJ-45 if 10 BaseT or 100 BaseTX is used) connected to a port.

Outlets according to the present invention can be installed as part of an original network installation, as a retrofit to an existing network, or to set up a network over existing telephone wiring.

BRIEF DESCRIPTION OF THE DRAWINGS

The invention is herein described, by way of non-limiting example only, with reference to the accompanying drawings, wherein.

DETAILED DESCRIPTION OF THE INVENTION

Figure 1:
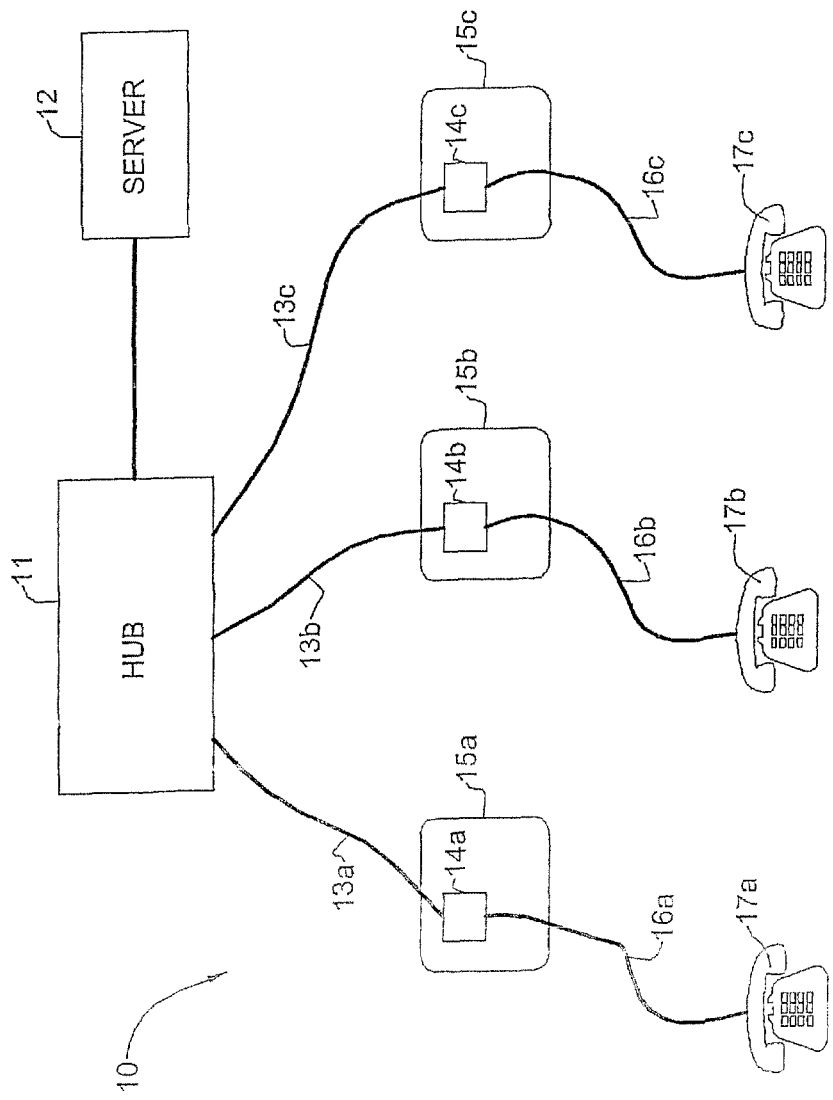
FIG. 1 shows a prior art local area network supporting IP telephony.
Figure 2:
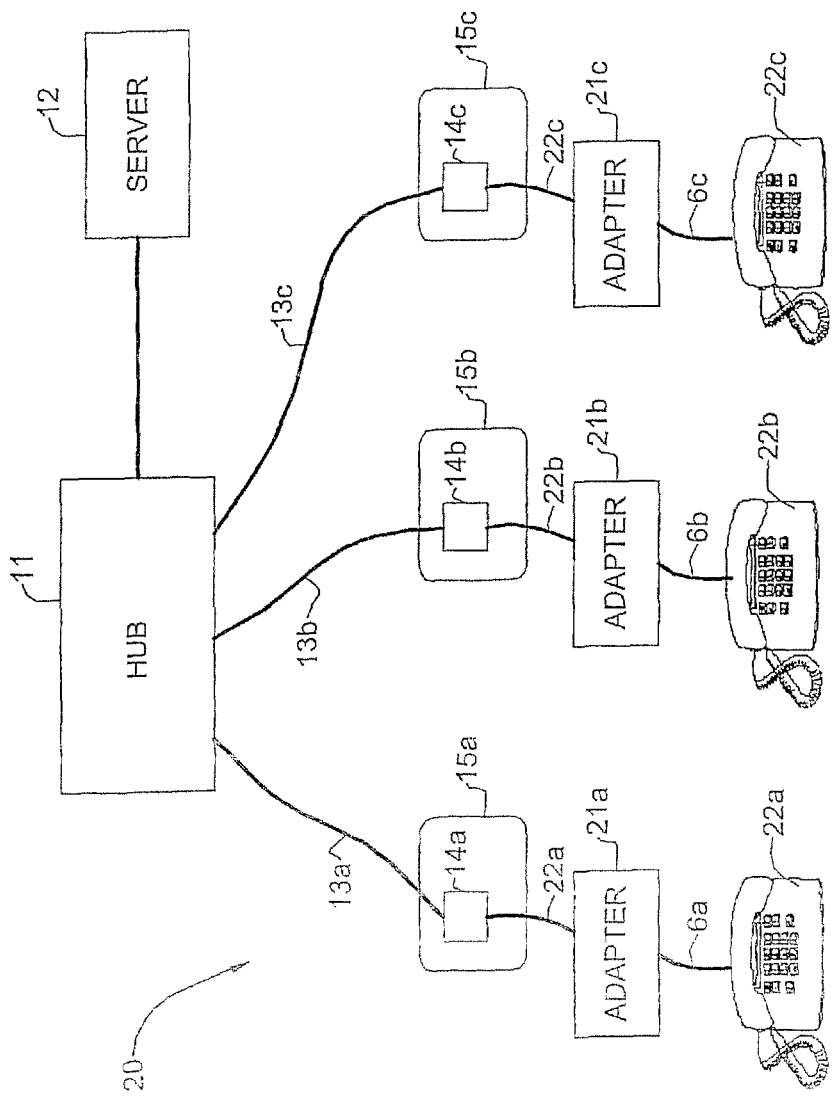
FIG. 2 shows a prior art local area network supporting IP telephony, using analog telephone sets.
Figure 3:
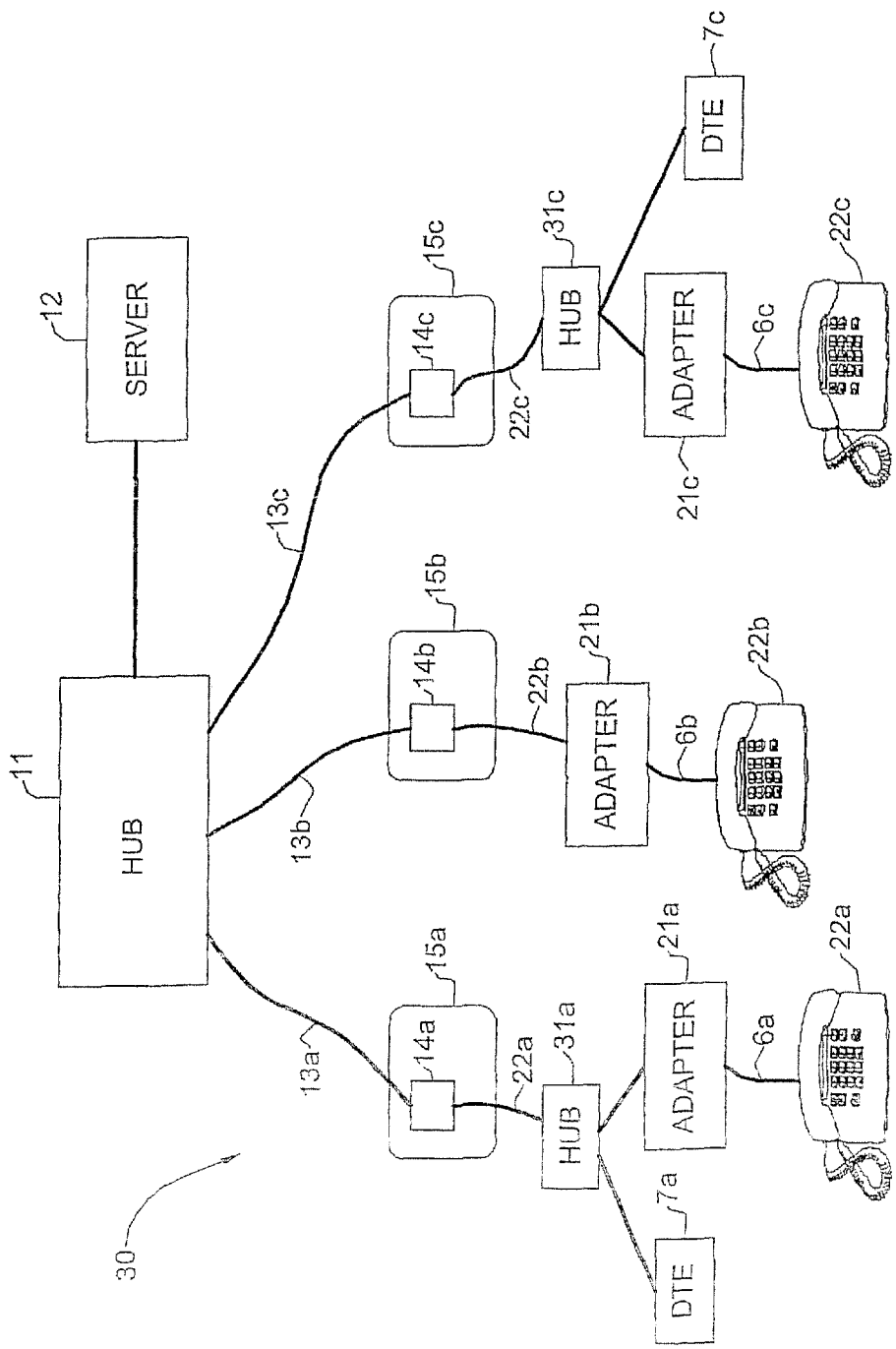
FIG. 3 shows a prior art local area network supporting both IP telephony using analog telephone sets and DTE connectivity.
Figure 4:
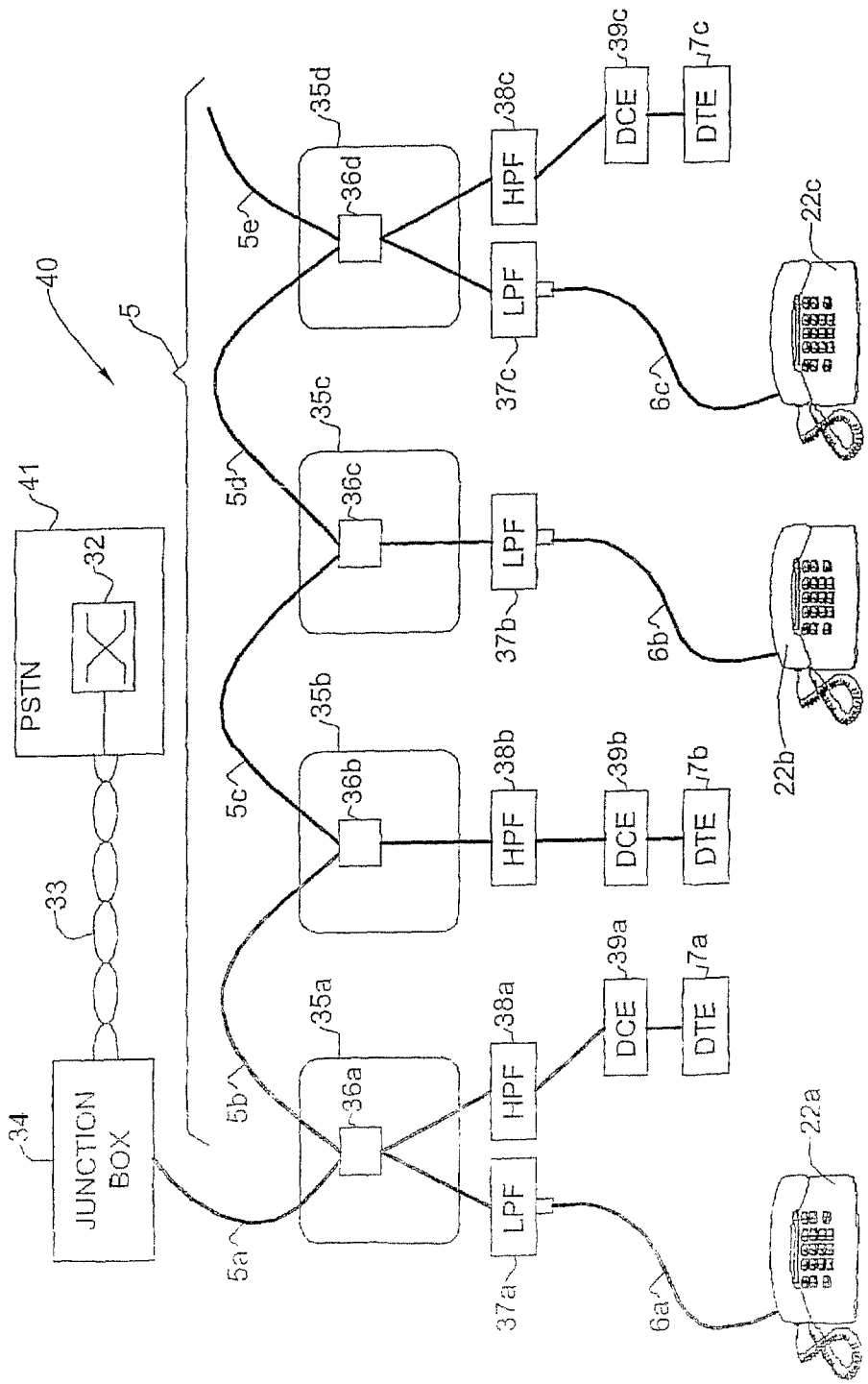
FIG. 4 shows a prior art local area network over telephone lines.
Figure 5:
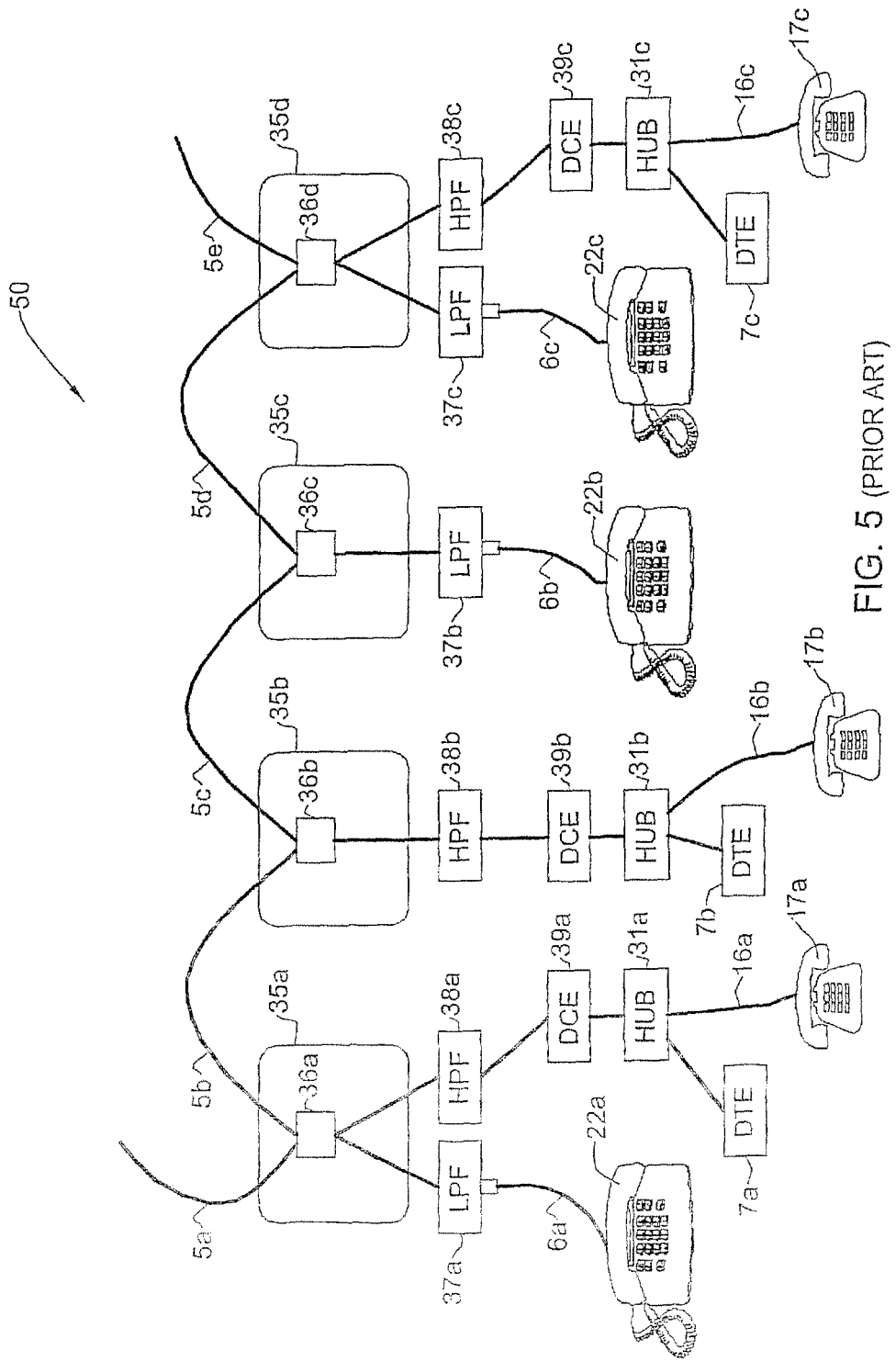
FIG. 5 shows a prior art local area network over telephone lines supporting both IP telephony and DTE connectivity.
Figure 6:
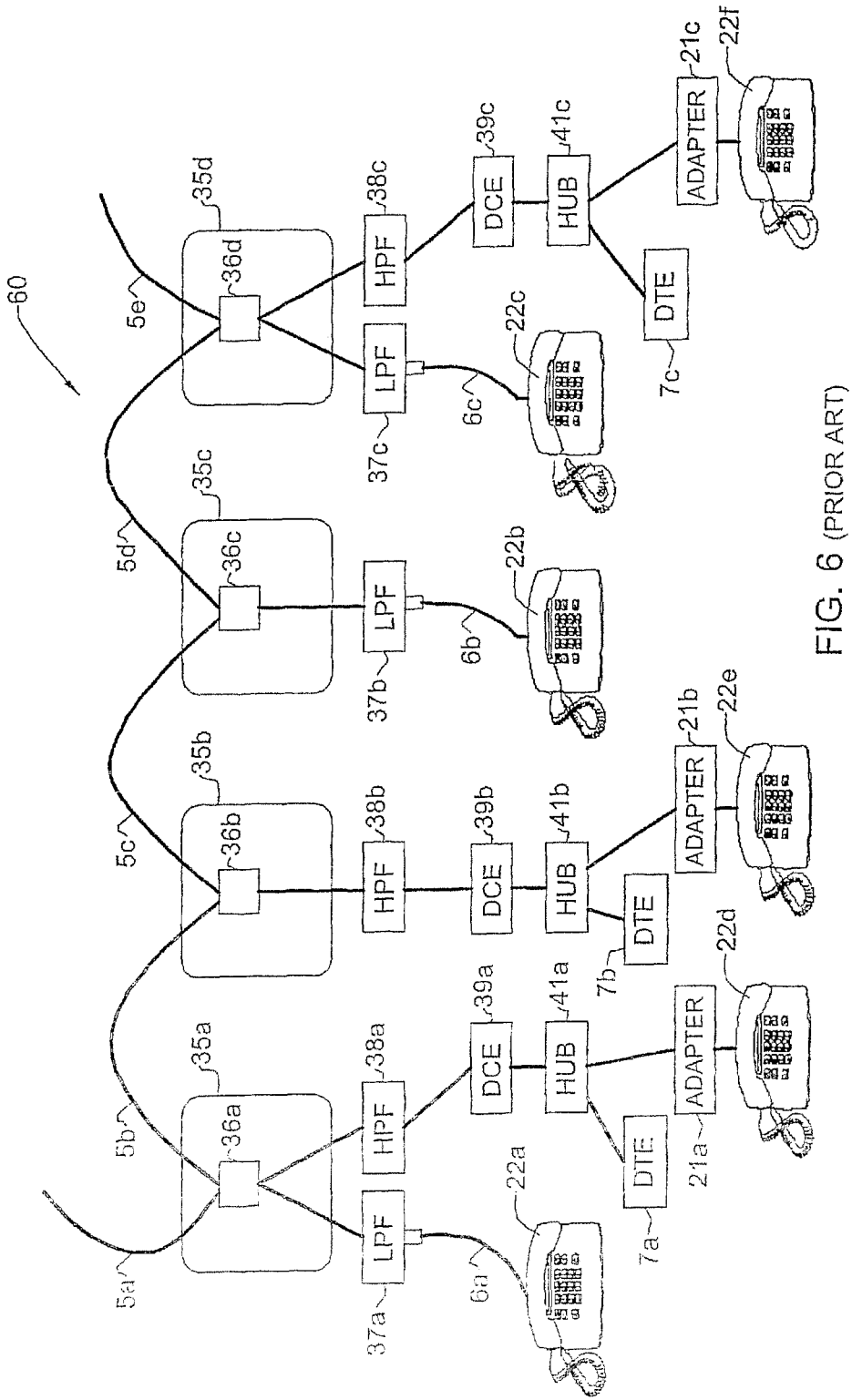
FIG. 6 shows a prior art local area network over telephone lines supporting both IP telephony using analog telephone sets and DTE connectivity.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 7B:
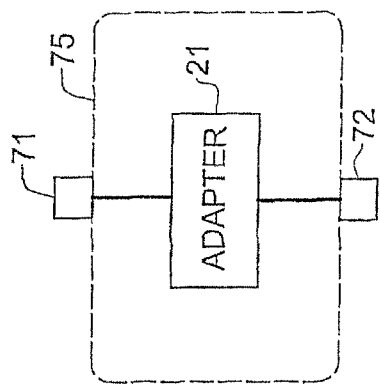
FIGS. 7a and 7b show schematically outlets according to different embodiments of the invention.
Figure 7A:
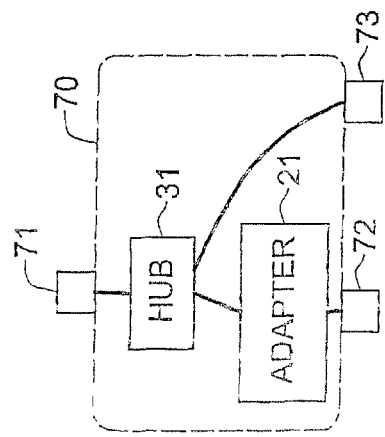

FIGS. 7a and 7b shows schematically outlets 70 and 75 according to two different embodiments of the invention. As shown in FIG. 7b, the outlet 75 includes a VoIP to analog telephony adapter 21. Outlet 75 connects to data network wiring via a connector 71. Connector 71 is preferably located at the rear of outlet 75, where outlet 75 mechanically mounts to an interior wall of a building. Outlet 75 connects to an analog telephone set via a jack 72. Jack 72 is preferably located at the front, or "panel" of outlet 75, which is visible when outlet 75 is mounted on an interior wall of a building. Jack 72 can be an RJ-11 jack, which is commonly used in North America for analog telephony. Outlet 75 allows connecting an analog telephone set (via jack 72) to the data network via connector 71, bridged by an adapter 21. As shown in FIG. 7a, the outlet 70 also includes the adapter 21, but further includes a hub 31 and a data jack 73, which is connected directly to hub 31. Because of the hub 31, the outlet 70 allows both an analog telephone (via jack 72) and a data unit (via jack 73) to be connected to the data network via connector 71. Preferably, both jack 72 and jack 73 are located at the front, or "panel" of outlet 70.

Figure 8:
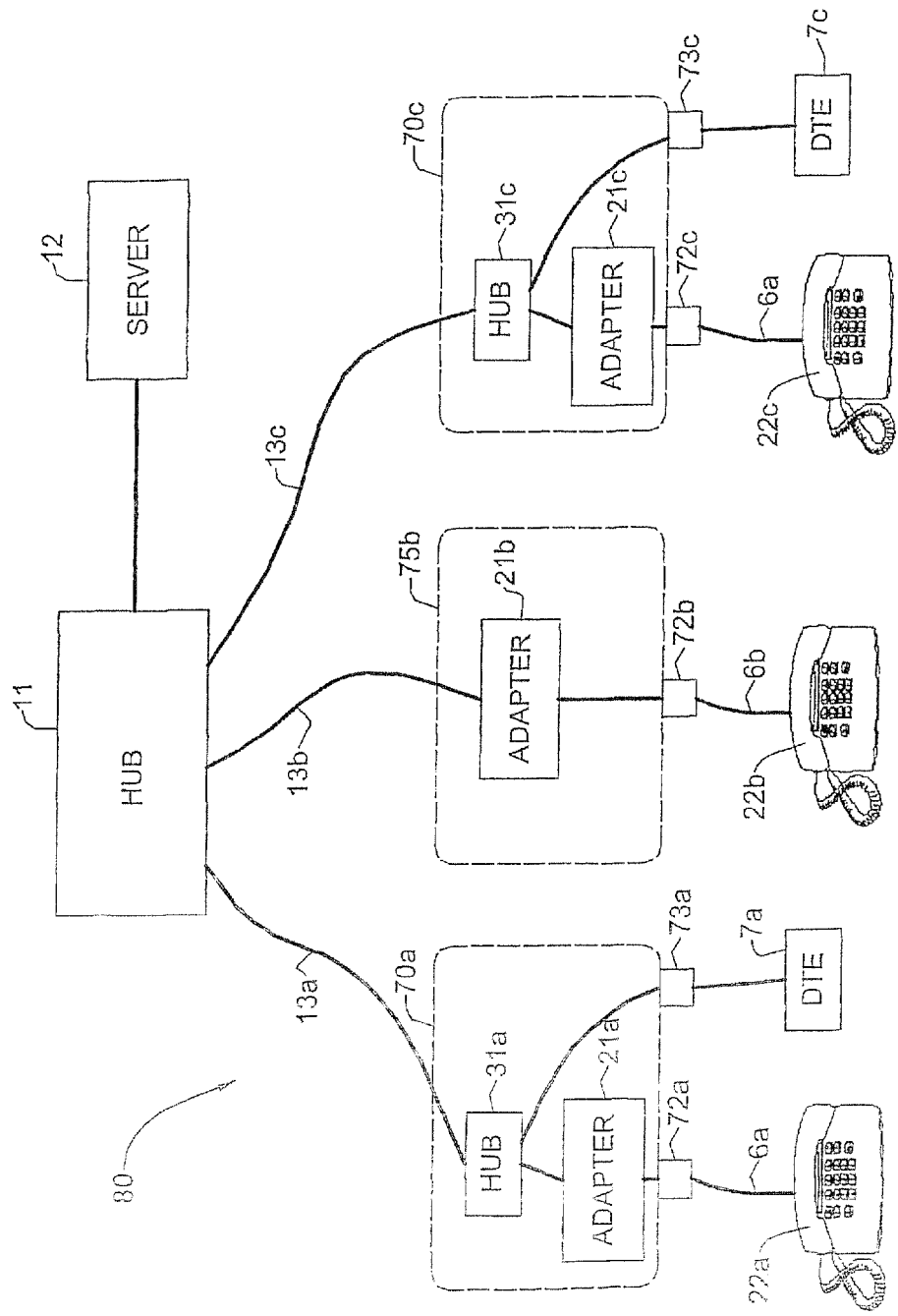
FIG. 8 shows a local area network supporting both IP telephony using analog telephone sets and DTE connectivity, employing outlets according to the present invention.

FIG. 8 shows a Local Area Network (LAN) 80 according to the present invention. Basically, the infrastructure of network 80 is the same as that of prior art network 10 (FIG. 1), in which hub 11 is connected in a 'star' topology to various end units via network wiring 13a, 13b, and 13c, and outlets 15a, 15b, and 15c. However, according to the present invention, outlets 15a, 15b, and 15c of the prior art network 10 are replaced by outlets 70a, 75b, and 70c, respectively, each of which contain an adapter as previously described with reference to FIGS. 7a and 7b of the drawings. For example, outlet 75b has a built-in adapter 21b. Outlet 75b allows for connection of an analog telephone set 22b using a cable 6b. Similarly, outlets 70a and 70c allow analog telephone sets 22a and 22c, respectively, to be connected to the network via cables 6a and 6c, respectively, using internal adapters 21a and 21c, respectively. Hubs 31a and 31c integrated within outlets 70a and 70c, respectively, allow for the connection of DTE units 7a and 7c, respectively, to the network, in addition to analog telephones 22a and 22c, respectively. Network 80 allows networking of both DTE units 7a and 7c and analog telephone sets 22a, 22b, and 22c, and instances of such a network may consist solely of instances of outlet 75 (FIG. 7b), supporting only analog telephony over the network, may consist solely of instances of outlet 70 (FIG. 7a), supporting both telephony and data networking, or a mixed configuration as shown in FIG. 8.

Network 80 offers the advantages of the VoIP technology, yet allows the use of common analog telephones, in the normal way of connecting an ordinary telephone, simply by plugging the telephone's standard connector into the jack 72 within the outlet.

Although outlets 70 and 75 so far have been described as having a single analog telephone connection, it is understood that multiple analog telephone jacks 72 can be supported, wherein separate adapters 21 are used to interface to each telephone jack within the outlets. Similarly, multiple data networking interfaces 73 can be supported in each outlet 70, each connected to different port of hub 31 as shown in FIG. 7a.

Powering outlets 70 and 75, as well as the analog telephones (via adapter 21) can be implemented either locally by connecting a power supply to each outlet, or, preferably, via the network itself. In the latter case, commonly known as "Power over LAN", the power can be carried to the outlet from a central location either by an additional wire pair, using the well-known phantom configuration, or by the FDM (Frequency Division/Domain Multiplexing) method. The latter commonly employs DC feeding, which is frequency-isolated from the data carried in the higher part of the spectrum.

Figure 9:
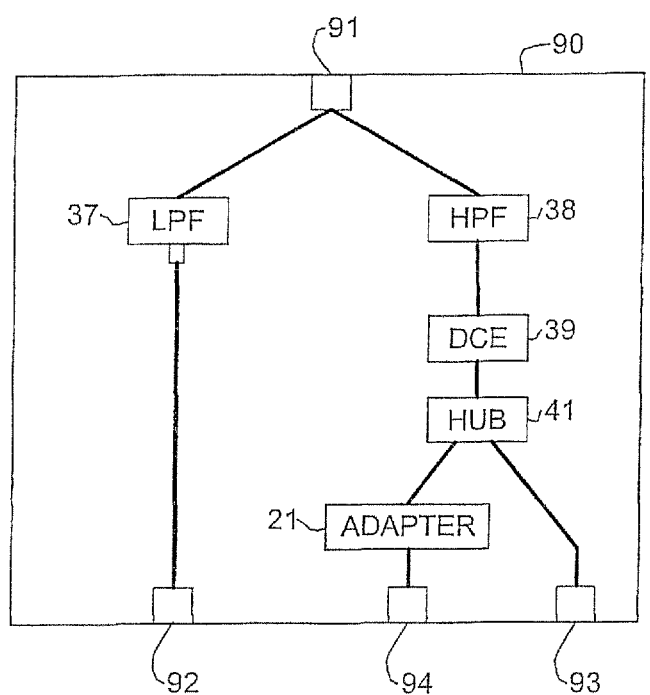
FIG. 9 illustrates an outlet supporting analog telephony and packet telephony according to the present invention.

In another embodiment, the invention is used in a data network over in-building telephone lines, where the analog telephony signals are carried in the low-frequency portion of the spectrum, and the data communication signals are carried in the high-frequency portion. FIG. 9 shows an outlet 90 according the present invention, which is able to separate and combine signals in different portions of the spectrum. Outlet 90 connects to the telephone wiring via a connector 91, preferably located at the rear part of outlet 90, where outlet 90 mechanically mounts to an interior wall of the building. A Low Pass Filter (LPF) 37 in outlet 90 is used for isolating the analog telephony part of the spectrum, for connecting an analog telephone via a jack 92. Jack 92 is preferably a standard telephone jack, such as RJ-11 in North-America. Data communication signals are isolated by a High Pass Filter (HPF) 38, which connects to a Data Communications Equipment (DCE) unit 39, containing a modem for data communications over the telephone line media. An integrated hub 41 allows sharing data between VoIP adapter 21 and a data jack 93, for connecting external devices to the network via DEC unit 39 with a standard data networking interface (such as a 10 BaseT interface per IEEE802.3). The adapter 21 allows connection of an analog telephone set to a jack 94, similar to jack 92, as previously described, thereby allowing digitized/packetized analog voice signals used by an analog telephone connected to the jack 94 to be multiplexed on data signals received by the data jack 93. Jack 94 is preferably a standard telephone jack, such as RJ-11 in North-America. Outlet 90 supports both standard analog telephony (via jack 92) as well as VoIP telephony using a standard analog telephone, via jack 94.

Thus, outlet 90 supports three types of interface: Regular analog telephony (via jack 92), data communications (via jack 93), and VoIP telephony (via jack 94). A subset of such functionalities can also be provided. For example, an outlet solely supporting VoIP telephony can be implemented, eliminating the need for LPF 37 and jack 92, as well as eliminating hub 41 and jack 93. In such a case, adapter 21 directly connects to DCE unit 39.

Figure 10:
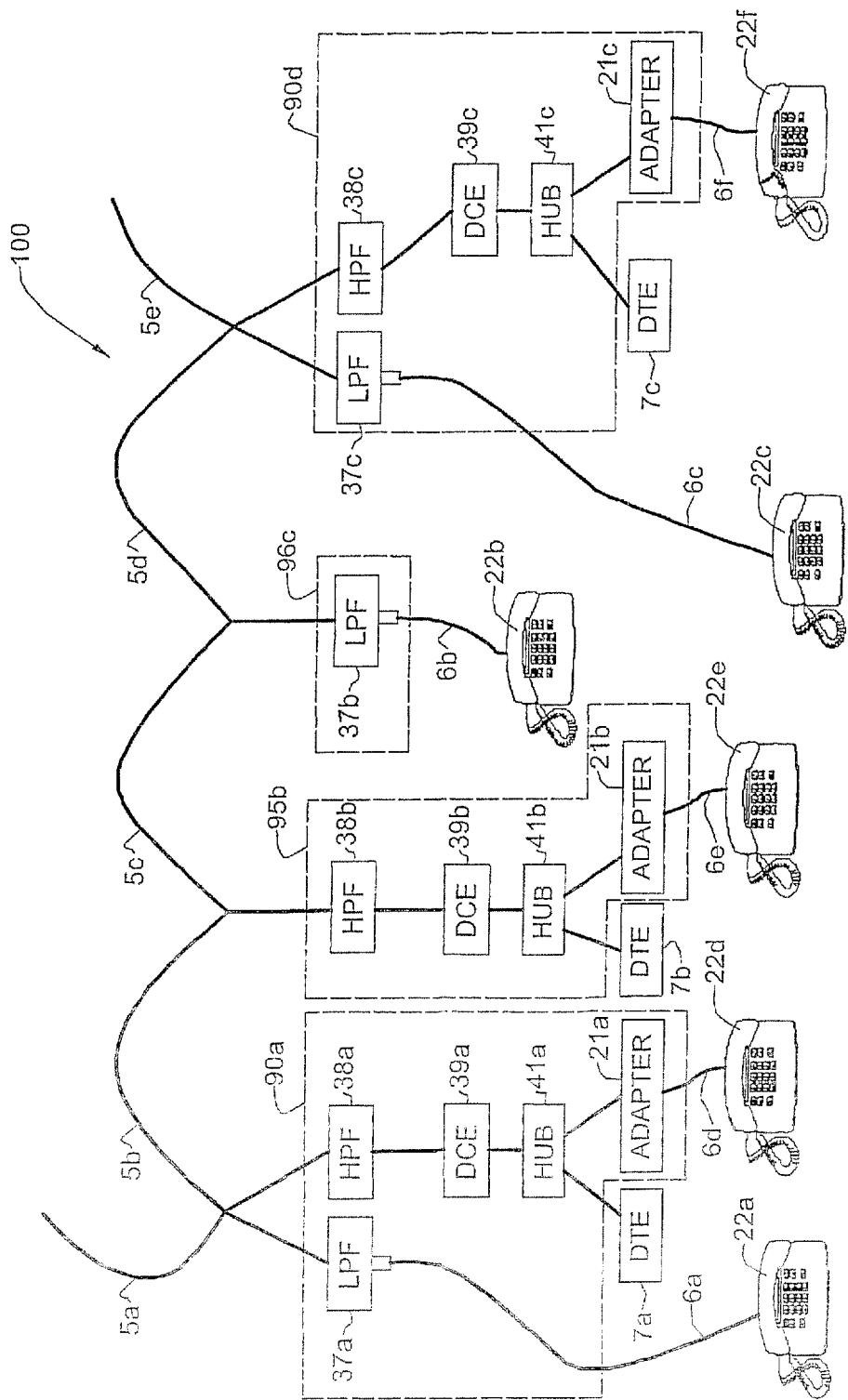
FIG. 10 illustrates a local area network over telephone lines supporting both IP telephony using analog telephone sets and DTE connectivity, employing outlets according to the present invention.

FIG. 10 illustrates a network 100 that operates over telephone lines 5a, 5b, 5c, 5d, and 5e according to the present invention. Network 100 employs outlets 90a, 90d, 95b and 96c. Outlet 95b differs from outlet 90a and outlet 90d by not having PSTN support, because no low-pass filter (LPF) and associated jack are present in outlet 95b as in outlet 90a and outlet 90d. Similarly, outlet 96c allows only for PSTN connection by employing LPF 37b and an analog telephone connector jack. Any mixture of such outlets (90a, 90d, 95b and 96c) is possible.

Network 100 of FIG. 10 supports regular PSTN telephony service via analog telephone sets 22a, 22b, and 22c. Simultaneously, VoIP telephony services can be accessed by analog telephone sets 22d, 22e, and 22f. In addition, data networking can be accomplished by data units 7a, 7b and 7c.

Although outlets 90a and 90d are each described above as having a single PSTN/POTS telephone connection, it is understood that multiple PSTN/POTS telephone interfaces can be supported within a single outlet. Similarly, it is understood that multiple VoIP/POTS telephone interfaces can be supported via multiple adapters (such as adapter 21a) within an outlet. Similarly, multiple data network interfaces can be included within an outlet, each connected to different port of the respective hub (such as hub 41a).

Life-Line

The term "life-line" refers to the concept of the telephone as a basic and emergency service, whose functionality must be maintained. As such, it is required that malfunctions in any other system or service (e.g. electricity) will not degrade the telephone system capability. In practical terms, this means that as long as an operative telephone set is actively connected to the telephone exchange via uninterrupted two-wires, the telephone service will be maintained, even in the case of a failure of electrical power.

A major drawback of using VoIP technology according to hitherto-proposed schemes is that life-line capability is not supported, and any failure of the data network (e.g. power outage, or hub, DCE, or software failure) will result in loss of the IP-telephony based service. The absence of "life-line" capability with regard to analog telephone 22d may be seen in FIG. 10. Thus, analog telephone 22d is connected via the data network through adapter 21a, hub 41a, and DCE unit 39a, and thus a power failure or failure of any one of these active devices will cause a loss of service via analog telephone 22d.

Hence analog telephone 22d does not have "life-line" capability. The same is true of analog telephones 22e and 22f.

In contrast, however, analog telephone 22a is connected to telephone line 5a/5b through a low-pass filter 37a. LPF 37a is a passive device of relatively high reliability and immunity to failure. Thus, analog telephone 22a retains life-line capability as part of the PSTN network. This also holds for analog telephone 22c. Thus, network 100 has partial life-line capability.

Figure 11:
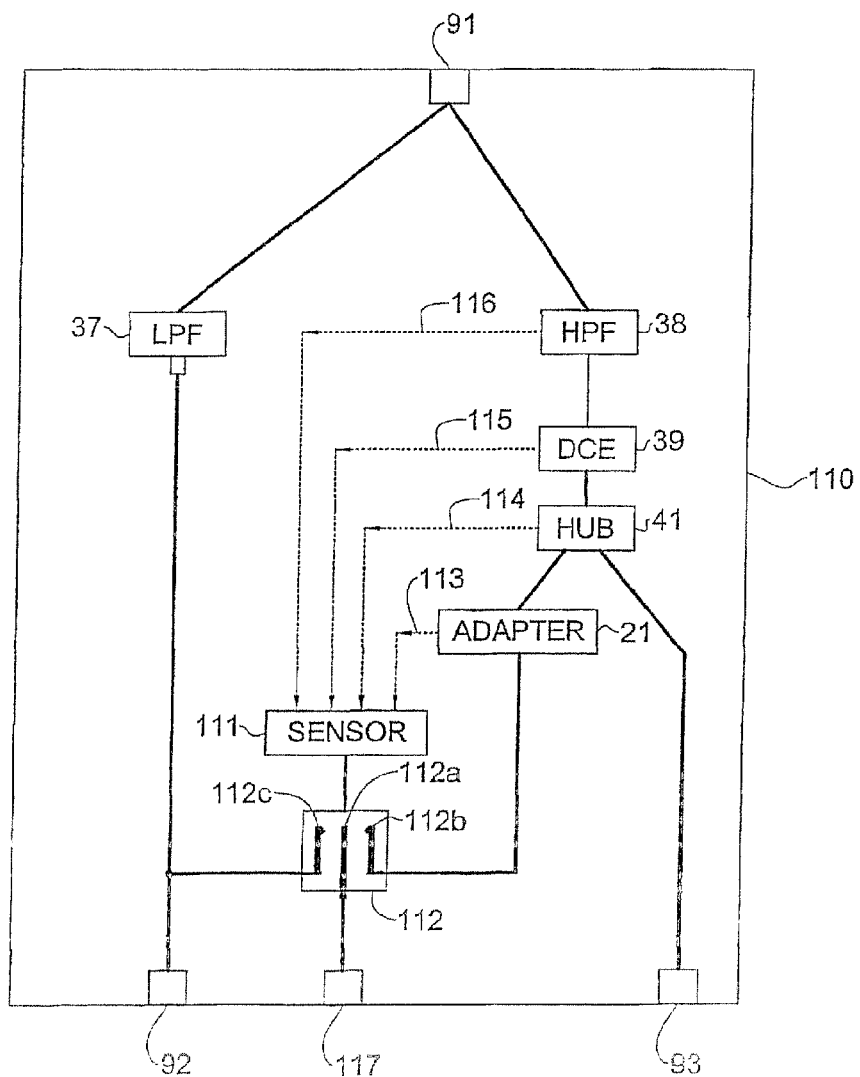
FIG. 11 illustrates a first outlet according to the present invention for providing life-line telephone capability for a telephone normally used in packet telephony.

FIG. 11 illustrates an outlet 110 according to the present invention for insuring universal life-line capability. Outlet employs a relay 112 which operates in a 'fall-away' mode, as is well-known in the art. Relay 112 is the principal component added to those components in outlet 90a to provide a telephone connection which for the most part is based on packet telephony, but which also provides life-line capability. Outlet 110 has several jacks. A jack 93 connects directly to a hub 41 to provide a full-time data connection. A jack 92 connects directly to a low-pass filter 37 to provide a full-time analog telephony connection. A jack 117 connects to a pole 112a of relay 112. A throw 112b of relay 112 is connected to adapter 21, which provides conversion between VoIP packet telephony and analog telephony. A throw 112c, however, is connected to LPF 37. In non-energized state, pole 112a connects to pole 112c. A Sensor 111 controls the state of relay 112, depending on the availability of data communications on the network. Inputs 113, 114, 115, and 116 to sensor 111 come from adapter 21, hub 41, DCE unit 39, and the input to high-pass filter 38, respectively and thus sensor 111 is able to detect any failure of the local or network data path, such as no network activity, loss of network power, or any other fault condition. In normal operation, when network data communications are functioning, relay 112 is triggered to connect jack 117 to adapter 21, and thus jack 117 normally connects an analog telephone to a packet telephony network via a VoIP/analog adapter. In the event of any failure of network data communications or power outage, sensor 111 releases relay 112 to switch jack 117 to LPF 37, and thus an analog telephone connected to jack 117 remains active even if the data network is inoperative, provided that the analog telephone service is available. Outlet 110 thus has life-line capability while normally supporting packet telephony. Under these circumstances, jack 92 may not be necessary and can be eliminated. It will be understood that while in the preceding description, a mechanical relay is used for the above switching functionality, any switching mechanism can be equally employed. Thus, within the context of the description and the appended claims, the term "relay" encompasses any electromechanical and electronic switches adapted to connect a common connection to either of two possible connections in response to an external trigger.

Figure 12:
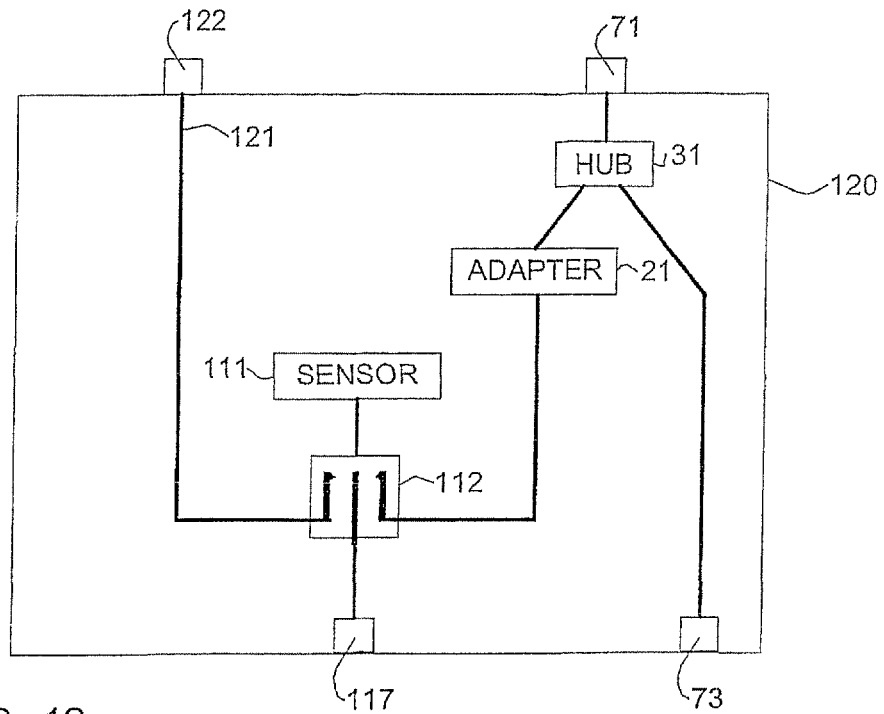
FIG. 12 illustrates a second outlet according to the present invention for providing life-line telephone capability in conjunction with a data network, where analog telephone signals are provided via a separate conductor.
Figure 13:
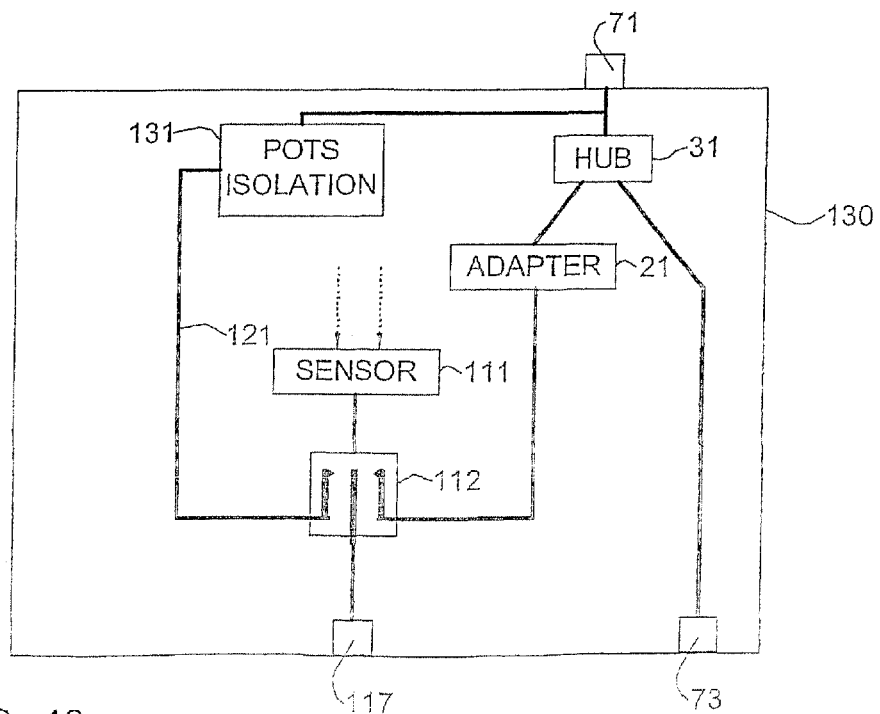
FIG. 13 illustrates a third outlet according to the present invention for providing life-line telephone capability in conjunction with a data network, where analog telephone signals are separated using FDM.

FIG. 12 illustrates another embodiment of an outlet according to the present invention for providing life-line capability. Whereas outlet 110 (FIG. 11) has been described with reference to a telephone line data networking environment, which has analog telephony inherently available, FIG. 12 illustrates an outlet 120 which can be applied to any LAN. Relay 112 and sensor 111 perform the same functions as previously described for outlet 110. However, analog telephone signals are not commonly available in network environments used strictly for data, and are therefore provided to outlet 120 via a connector 122 by dedicated wiring, preferably carried along with the network wiring structure. A line 121 carries the signals from connector 122 to a throw of relay 112. Alternatively, the analog telephony signals may be carried on the network wiring, such as by using FDM. FIG. 13 illustrates an outlet 130 for use in such a case, where a POTS isolation unit 131 feeds the analog signal via line 121 to relay 112.

Figure 14:
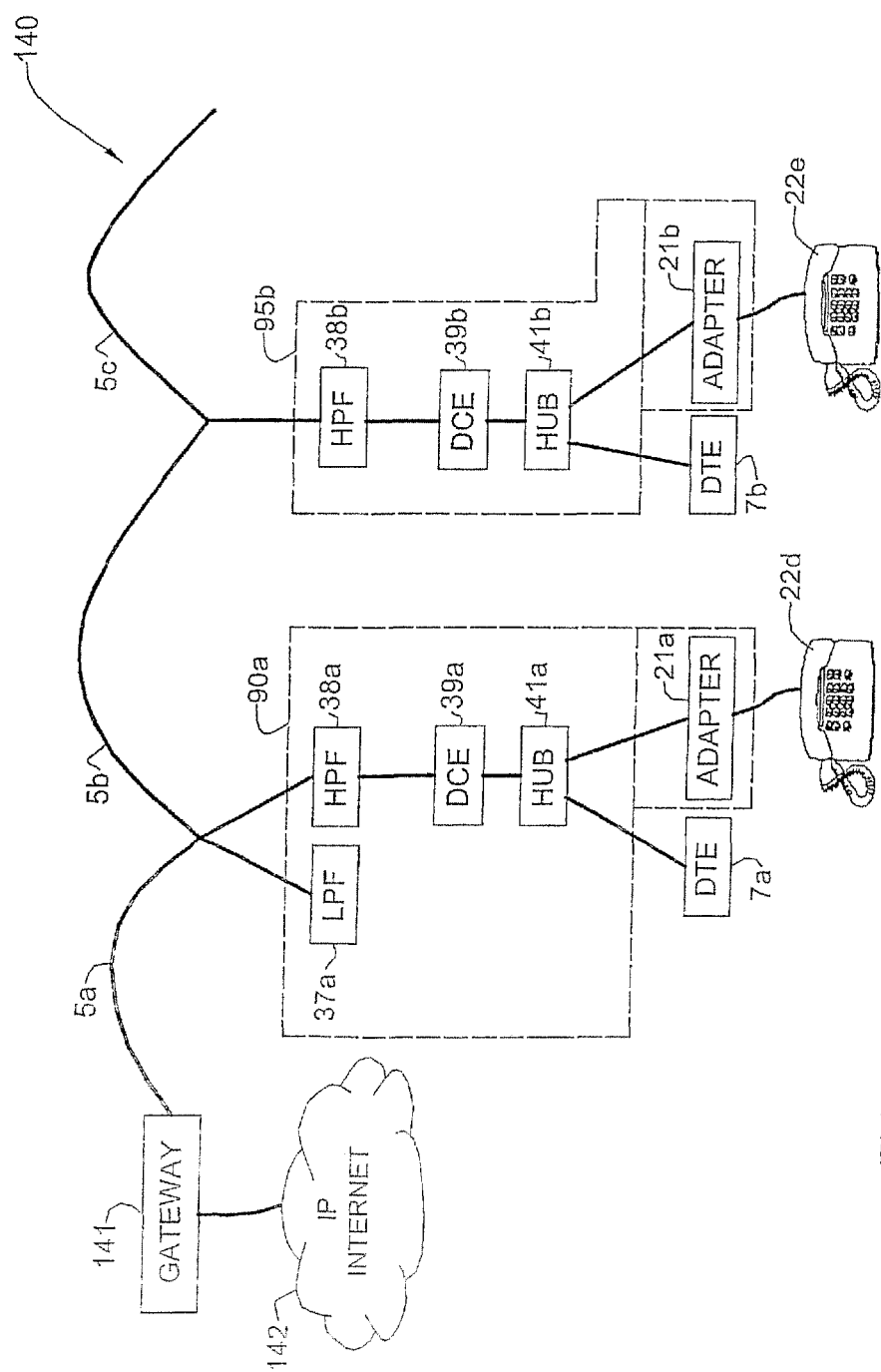
FIG. 14 illustrates a global network connected via a gateway to a local network existing within a building, and which provides packet telephony services to analog telephones via in-building outlets according to the present invention.

FIG. 14 illustrates the main application of the present invention. A network 140 includes part or all of network 100, which exists within a building. Network 140 connects to an IP network 142, operated by a service provider or 'IP-carrier', and which carries both data and voice (using the VoIP technique). A gateway 141 is used for bridging the in-building network to IP network 142, and is connected to existing in-home telephone wiring 5a, 5b, and 5c. This configuration allows the IP-carrier to provide both data and voice services, eliminating the need to modify or add in-building wiring, and requiring only replacement of the telephone outlets.

Figure 15:
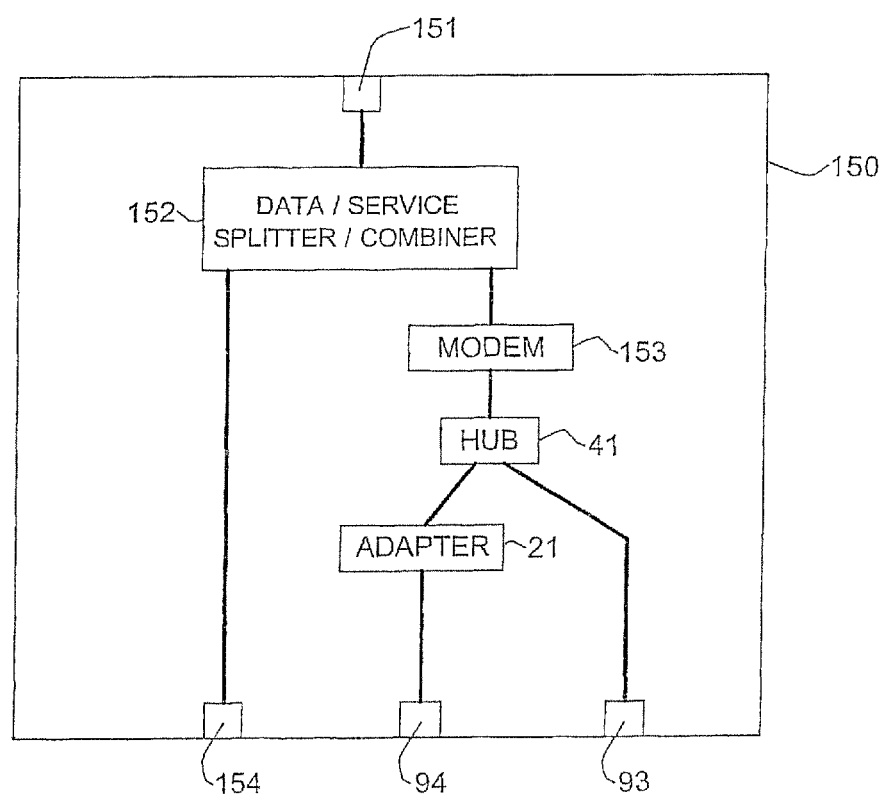
FIG. 15 illustrates a general form of an outlet according to the present invention, which can serve in various wired network environments, such as CATV and electrical power networks.

Although the invention has been so far demonstrated as relating to telephone wiring and telephone outlets, the invention can be similarly applied to any type of wired networking within a building, such as CATV or electrical power wiring. FIG. 15 illustrates an outlet 150, which is a general embodiment of the present invention. Outlet 150 is similar in overall layout to outlet 90 (FIG. 9). Outlet 150 connects to the relevant wiring via a connector 151 and contains an integrated data/service splitter/combiner unit 152, which isolates the data carried over the wiring from the main service signal. In the case of telephony, unit 152 contains a low-pass filter (such as LPF 37) and a high-pass filter (such as HPF 38). In the case of electrical power wiring, the AC power is split by unit 152 and fed to a socket 154, for supplying electrical power as normal. In such a case, a modem 153 being a power-line carrier (PLC) modem interfaces the hub 41 to the integrated data/service splitter/combiner unit 152, and allows data communication over the power line. Similarly, in the case of a CATV application, where the CATV wiring is used for the network infrastructure, a coaxial cable modem is used as modem 153 and unit 152 isolates the CATV signal from the data signal.

Although the invention has been so far described as relating to IP-based data networks, the invention can be similarly applied to any type of packet data network. Furthermore, although packet networks are the most important for wide area networks, the invention is not restricted to packet networks only, and can be applied to any digital data network, where voice signals are digitized and carried in digital form.

Furthermore, although the invention has been described as relating to networks based on continuous electrical conducting media (telephone, CATV, or electrical power), and the relevant modem and associated circuitry are connected in parallel to the wiring infrastructure, the invention can be applied equally to the case wherein the wiring is not continuous, but is cut into discrete segments as disclosed in WO 00/07322 to the present inventor, which is incorporated by reference for all purposes as if fully set forth herein.

While the invention has been described with respect to a limited number of embodiments, it will be appreciated that many variations, modifications and other applications of the invention may be made.

What is claimed is:

1. A network for coupling a plurality of analog telephone devices to the Internet, the network comprising:
    a telephone wire pair at least in part in a wall within a building, said wire pair being connected for concurrently carrying an analog telephone signal carried in an analog telephone signal frequency band frequency multiplexed with a digital data signal carried in a digital data signal frequency band, the digital data signal containing digitized and packetized telephone data, the digital data signal frequency band being distinct from, and higher than, the analog telephone signal frequency band;

a gateway connected between said telephone wire pair and the Internet, said gateway being operative to couple the digital data signal between the telephone wire pair and the Internet; and a first device housed within a single enclosure and connected to said telephone wire pair, said first device being connectable to a first analog telephone device and comprising a relay connected to the first analog telephone device, said relay being operative to couple the analog telephone signal to the first analog telephone device only when the digital data signal is not present on said telephone wire pair, wherein the digitized and packetized telephone data is based on Voice over Internet Protocol, and said enclosure is attached to a wall of a building, and wherein said enclosure is mounted in the wall of the building.

2. The network according to claim 1, further comprising a second device that is operative to convert between the digitized and packetized telephone data and a second analog telephone signal, said second device being connectable to a second analog telephone device and being operative to couple the second analog telephone signal to the second analog telephone device.

3. The network according to claim 1 further operative to couple a data terminal equipment unit to the Internet, the device further comprising a data connector connectable to the data terminal equipment unit, and operative to couple the digital data signal to the data terminal equipment unit.

4. The network according to claim 1 wherein said gateway is operative to couple to a distinct service provider over the Internet, to couple to digital data from the distinct service provider.

5. The network according to claim 1 wherein said gateway is connected to the Internet by a DSL medium.

6. The network according to claim 1 wherein said first device is attachable to a telephone outlet.

7. The network according to claim 1 wherein said gateway is operative to connect to a distinct service provider to couple to data and voice services from the distinct service provider.

8. A network for coupling a plurality of analog telephone devices to the Internet, the network comprising:

a telephone wire pair at least in part in a wall within a building, said wire pair being connected for concurrently carrying an analog telephone signal carried in an analog telephone signal frequency band frequency multiplexed with a digital data signal carried in a digital data signal frequency band, the digital data signal containing digitized and packetized telephone data, the digital data signal frequency band being distinct from, and higher than, the analog telephone signal frequency band;

a gateway connected between said telephone wire pair and the Internet, said gateway being operative to couple the digital data signal between the telephone wire pair and the Internet; and a first device housed within a single enclosure and connected to said telephone wire pair, said first device being connectable to a first analog telephone device and comprising a relay connected to the first analog telephone device, said relay being operative to couple the analog telephone signal to the first analog telephone device only when the digital data signal is not present on said telephone wire pair, wherein the digitized and packetized telephone data is based on Voice over Internet Protocol, and said enclosure is attached to a wall of a building, and wherein said first device is housed within a telephone outlet.

9. The network according to claim 8, further comprising a second device that is operative to convert between the digitized and packetized telephone data and a second analog telephone signal, said second device being connectable to a second analog telephone device and being operative to couple the second analog telephone signal to the second analog telephone device.

10. The network according to claim 8, wherein said enclosure is mounted in the wall of the building.

11. The network according to claim 8, further operative to couple a data terminal equipment unit to the Internet, The device further comprising a data connector connectable to the data terminal equipment unit, and operative to couple the digital data signal to the data terminal equipment unit.

12. The network according to claim 8 wherein said gateway is operative to couple to a distinct service provider over the Internet, to couple to digital data from the distinct service provider.

13. The network according to claim 8, wherein said gateway is connected to the Internet by a DSL medium.

14. The network according to claim 8, wherein said gateway is operative to connect to a distinct service provider to couple to data and voice services from the distinct service provider.

* * * * *